US009634856B2

United States Patent
Kubo et al.

(10) Patent No.: US 9,634,856 B2
(45) Date of Patent: Apr. 25, 2017

(54) AIR-CONDITIONING SYSTEM AND RELAY DEVICE

(75) Inventors: Takayoshi Kubo, Tokyo (JP); Akihiro Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 14/395,870

(22) PCT Filed: Jun. 13, 2012

(86) PCT No.: PCT/JP2012/003864
§ 371 (c)(1),
(2), (4) Date: Oct. 21, 2014

(87) PCT Pub. No.: WO2013/186811
PCT Pub. Date: Dec. 19, 2013

(65) Prior Publication Data
US 2015/0078391 A1 Mar. 19, 2015

(51) Int. Cl.
*H04L 12/28* (2006.01)
*F24F 11/00* (2006.01)
(Continued)

(52) U.S. Cl.
CPC ........ *H04L 12/2838* (2013.01); *F24F 11/006* (2013.01); *F24F 11/008* (2013.01);
(Continued)

(58) Field of Classification Search
CPC .... F24F 11/006; F24F 11/008; H04L 12/2838
See application file for complete search history.

(56) References Cited

U.S. PATENT DOCUMENTS

| | | | |
|---|---|---|---|
| 2007/0150616 A1* | 6/2007 | Baek | H04L 12/2602 709/246 |
| 2009/0139251 A1* | 6/2009 | Masui | F24F 11/0009 62/129 |

(Continued)

FOREIGN PATENT DOCUMENTS

| | | |
|---|---|---|
| CN | 1427219 A | 7/2003 |
| CN | 101989072 A | 3/2011 |

(Continued)

OTHER PUBLICATIONS

Office Action mailed Nov. 10, 2015 issued in corresponding JP patent application No. 2014-520800 (and English translation).

(Continued)

*Primary Examiner* — Jae Y Lee
(74) *Attorney, Agent, or Firm* — Posz Law Group, PLC

(57) ABSTRACT

In an air-conditioning system, an outdoor unit and an indoor unit communicate through a relay device, including a plurality of communication ports; a plurality of communication networks having logical connection relationships with the respective communication ports; and a plurality of nodes having logical connection relationships with the respective communication networks. The plurality of nodes are each associated with one of the outdoor unit and the indoor unit. Among the plurality of nodes, a certain node is set as a first node, and another certain node different from the first node is set as a second node. The relay device executes transfer processing of transferring a communication frame from the first node to the second node, and then if the relay device does not receive a reception acknowledgment signal from the second node, limits a number of re-transmission times when the relay device re-transfers the communication frame to the second node.

17 Claims, 20 Drawing Sheets

(51) Int. Cl.
 *F25B 13/00* (2006.01)
 *F25B 49/02* (2006.01)

(52) U.S. Cl.
 CPC ....... *F24F 2011/0067* (2013.01); *F25B 13/00* (2013.01); *F25B 49/022* (2013.01); *F25B 2313/023* (2013.01); *F25B 2313/025* (2013.01); *F25B 2313/0314* (2013.01); *F25B 2600/021* (2013.01); *F25B 2700/1931* (2013.01); *F25B 2700/1933* (2013.01); *F25B 2700/21151* (2013.01); *F25B 2700/21152* (2013.01); *Y02B 30/741* (2013.01)

(56) References Cited

U.S. PATENT DOCUMENTS

2010/0027493 A1    2/2010  Dinulescu et al.
2010/0250805 A1*   9/2010  Cohen ................. G06F 13/4004
                                                     710/110

FOREIGN PATENT DOCUMENTS

| EP | 1 321 722 A2 | 6/2003 |
|---|---|---|
| JP | 09-275414 A | 10/1997 |
| JP | 2005-157432 A | 6/2005 |
| JP | 3995469 B2 | 8/2007 |
| JP | 2009-060228 A | 3/2009 |
| JP | 2010-032160 A | 2/2010 |
| JP | 2010-514244 A | 4/2010 |
| JP | 2011-047532 A | 3/2011 |

OTHER PUBLICATIONS

Office Action dated May 25, 2016 issued in corresponding CN patent application No. 201280073549.2 (and English translation).
International Search Report of the International Searching Authority mailed Aug. 21, 2012 for the corresponding international application No. PCT/JP2012/003864 (and English translation).
Office Action dated Jan. 9, 2017 issued in corresponding CN patent application No. 201280073549.2 (and English translation).

* cited by examiner

FIG. 3

| PORT | | | | | |
|---|---|---|---|---|---|
| A PORT | | B PORT | | C PORT | |
| ADDRESS | MODEL | ADDRESS | MODEL | ADDRESS | MODEL |
| #1 | INDOOR | #2 | OUTDOOR | #3 | OUTDOOR |

FIG. 8

| PORT ||||||
|---|---|---|---|---|---|
| A PORT || B PORT || C PORT ||
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | #11 | INDOOR |
| #4 | INDOOR | #8 | REMOTE CONTROLLER | #12 | CENTRALIZED MANAGEMENT DEVICE |

NODE INFORMATION BEFORE DEREGISTRATION

| PORT ||||||
|---|---|---|---|---|---|
| A PORT || B PORT || C PORT ||
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | #11 | INDOOR |
| #4 | INDOOR | #8 | REMOTE CONTROLLER | #12 | INDOOR |

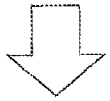

202

NODE INFORMATION AFTER DEREGISTRATION

| PORT ||||||
|---|---|---|---|---|---|
| A PORT || B PORT || C PORT ||
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | ~~#11~~ | ~~INDOOR~~ |
| #4 | INDOOR | #8 | REMOTE CONTROLLER | #12 | INDOOR |

FIG. 16

NODE INFORMATION BEFORE ADDITIONAL NODE REGISTRATION (203)

| PORT | | | | | |
|---|---|---|---|---|---|
| A PORT | | B PORT | | C PORT | |
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | #11 | INDOOR |
| #4 | INDOOR | #8 | REMOTE CONTROLLER | #12 | INDOOR |

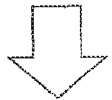

NODE INFORMATION AFTER ADDITIONAL NODE REGISTRATION (204)

| PORT | | | | | |
|---|---|---|---|---|---|
| A PORT | | B PORT | | C PORT | |
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | #11 | INDOOR |
| #4 | INDOOR | #8 | REMOTE CONTROLLER | #12 | INDOOR |
| #13 | OUTDOOR | — | — | — | — |

FIG. 19

| PORT | | | | | |
|---|---|---|---|---|---|
| A PORT | | B PORT | | C PORT | |
| ADDRESS | MODEL | ADDRESS | MODEL | ADDRESS | MODEL |
| #1 | OUTDOOR | #5 | OUTDOOR | #9 | OUTDOOR |
| #2 | INDOOR | #6 | INDOOR | #10 | OUTDOOR |
| #3 | INDOOR | #7 | INDOOR | #11 | INDOOR |
| #4 | INDOOR | #8 | REMOTE CONTROLLER | #12 | INDOOR |

FIG. 20

| PORT | | | | | |
|---|---|---|---|---|---|
| A PORT | | | | B PORT | |
| ADDRESS | MODEL | ADDRESS | MODEL | ADDRESS | MODEL |
| #1 | OUTDOOR | #6 | INDOOR | #11 | INDOOR |
| #2 | INDOOR | #7 | INDOOR | #12 | INDOOR |
| #3 | INDOOR | #8 | REMOTE CONTROLLER | — | — |
| #4 | INDOOR | #9 | OUTDOOR | — | — |
| #5 | OUTDOOR | #10 | OUTDOOR | — | — |

AIR-CONDITIONING SYSTEM AND RELAY DEVICE

CROSS REFERENCE TO RELATED APPLICATIONS

This application is a U.S. national stage application of PCT/JP2012/003864 filed on Jun. 13, 2012, the contents of which are incorporated herein by reference.

TECHNICAL FIELD

The present invention relates to an air-conditioning system and a relay device.

BACKGROUND

A conventional air-conditioning system has formed a plurality of communication networks, and each communication network has formed a plurality of nodes.

Each node has had physical connection-path information on the communication network, and it has been determined whether or not a received communication frame is transferred or not based on the connection-path information (see, for example Patent Literature 1).

PATENT LITERATURE

Patent Literature 1: Japanese Patent No. 3995469 (Paragraphs [0021] to [0027])

However, in the conventional air-conditioning system, since each node in some cases has not transferred the received communication frame to a specific communication network, a receivable communication frame has been determined depending on the position connected with the communication network of the air-conditioning system.

Hence, the communication contents of the entire air-conditioning system may not be monitored depending on the monitoring position on the communication network of the air-conditioning system.

Owing to this, to allow the same communication frame to be received at any position connected with the communication network of the air-conditioning system, for example, processing has been executed such that an outdoor main unit transfers all received communication frames to the respective communication networks.

In this case, if a node, serving as a transfer destination, is not present, re-transmission processing for the communication frame has been repeatedly executed.

Consequently, since the re-transmission processing has been repeated, the communication frame has been increased in the communication network, and communication traffic of the communication network of the air-conditioning system has not been possibly decreased.

Hence, there has been a problem in which the communication traffic of the communication network of the air-conditioning system cannot be decreased while monitoring the communication contents of the entire air-conditioning system at a desirable position on the communication network of the air-conditioning system.

SUMMARY

The present invention is made to address the above-described problem, and an object of the invention is to provide an air-conditioning system that can decrease the communication traffic of a communication network of the air-conditioning system while monitoring the communication contents of the entire air-conditioning system at a desirable position on the communication network of the air-conditioning system.

According to the invention, there is provided an air-conditioning system, in which at least one outdoor unit and at least one indoor unit are connected by a refrigerant pipe and operated, and the outdoor unit and the indoor unit make communication through a relay device. The air-conditioning system includes a relay device including a plurality of communication ports; a plurality of communication networks having logical connection relationships with the respective communication ports; and a plurality of nodes having logical connection relationships with the respective communication networks. The plurality of nodes are each associated with one of the outdoor unit and the indoor unit. Among the plurality of nodes, a certain node is set as a first node, and another certain node different from the first node is set as a second node. The relay device executes transfer processing of transferring a communication frame from the first node to the second node, and then if the relay device does not receive a reception acknowledgment signal from the second node, limits a number of re-transmission times when the relay device re-transmits the communication frame to the second node.

With the present invention, since the number of re-transmission times of the communication frame is limited, advantageous effects are provided in which the communication traffic of the communication network of the air-conditioning system can be decreased while monitoring the communication contents of the entire air-conditioning system at a desirable position on the communication network of the air-conditioning system.

BRIEF DESCRIPTION OF DRAWINGS

FIG. 3 shows an example configuration of a data table held in a relay device 61 according to Embodiment 1 of the invention.

FIG. 8 shows an example configuration of a data table held in a relay device 62 according to Embodiment 2 of the invention.

FIG. 13 shows a transition of registered contents of a data table held in a relay device 63 according to Embodiment 3 of the invention.

FIG. 16 shows a transition of registered contents of a data table held in a relay device 64 according to Embodiment 4 of the invention.

FIG. 19 shows an example configuration of a data table held in a relay device 65 according to Embodiment 5 of the invention.

FIG. 20 shows an example configuration of a data table held in a relay device 66 according to Embodiment 5 of the invention.

DETAILED DESCRIPTION

Embodiments 1 to 5 of the invention will be described in detail below with reference to the drawings.

Embodiment 1

Figure 1:
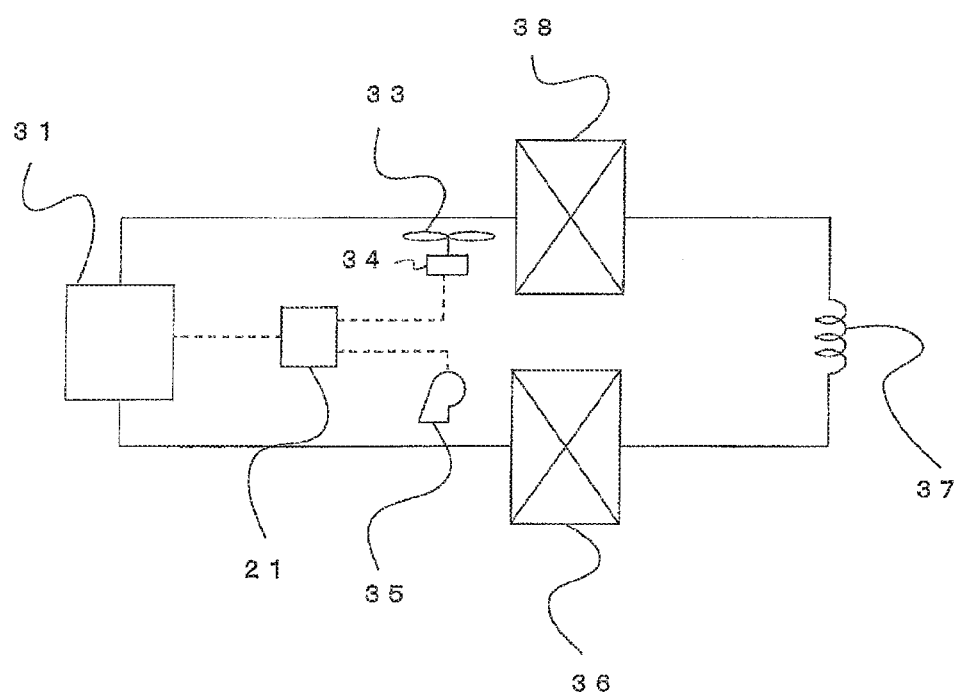
FIG. 1 shows an example configuration of a refrigerant circuit 11 according to Embodiment 1 of the invention.

FIG. 1 shows an example configuration of a refrigerant circuit 11 according to Embodiment 1 of the invention.

As shown in FIG. 1, the refrigerant circuit 11 includes a compressor 31, an indoor heat exchanger 36, expansion means 37, and an outdoor heat exchanger 38. These components are connected through refrigerant pipes and thus the refrigerant circuit 11 is formed.

The operation capacity of the compressor 31 can be variable. The compressor 31 is formed of, for example, a capacity compressor driven by a DC brushless motor (not shown) or the like, the operating frequency of which is controlled by an inverter.

The compressor 31 is controlled by an air-conditioning inverter device 21. For example, the compressor 31 is controlled by determining the operating amount in accordance with the deviation between a temperature detected by a sensor (described later) arranged at the indoor heat exchanger 36 and a preset temperature.

A sensor that detects the temperature of a discharged refrigerant may be provided at the discharge side of the compressor 31.

Alternatively, a sensor that detects the temperature of the sucked refrigerant may be provided at the suction side of the compressor 31.

Alternatively, a sensor that detects the pressure of the discharged refrigerant may be provided at the discharge side of the compressor 31.

Alternatively, a sensor that detects the pressure of the sucked refrigerant may be provided at the suction side of the compressor 31.

Alternatively, a sensor that detects the surface temperature of a housing may be provided at the housing of the compressor 31.

The indoor heat exchanger 36 functions as a use-side heat exchanger. An indoor fan 35 is arranged near the indoor heat exchanger 36.

The indoor heat exchanger 36 cools the air in a room (not shown, hereinafter, referred to as indoor) because the indoor heat exchanger 36 functions as an evaporator of the refrigerant during cooling operation. The indoor heat exchanger 36 is formed of, for example, a cross-fin fin-and-tube heat exchanger including a heat transfer tube and multiple fins.

The refrigerant circuit 11 without a four-way valve is described here. However, if the four-way valve is provided, the indoor heat exchanger 36 heats the indoor air because the indoor heat exchanger 36 functions as a condenser of the refrigerant during heating operation.

A sensor that detects the temperature of the refrigerant in a two-phase gas-liquid state may be arranged near the indoor heat exchanger 36.

Also, a sensor that detects the temperature of the refrigerant in a liquid state or the two-phase gas-liquid state may be arranged at the liquid side of the indoor heat exchanger 36.

The indoor fan 35 has a function of supplying the air after the heat exchange between the indoor air and the refrigerant by the indoor heat exchanger 36, as supply air, to the inside of the room. The indoor fan 35 is formed of a fan, the flow rate of the air of which supplied to the indoor heat exchanger 36 can be variable. The indoor fan 35 is particularly formed of, for example, a centrifugal fan or a multi-fin fan that is driven by an indoor-fan driving unit (not shown) formed of a DC fan motor.

The expansion means 37 reduces the pressure of the refrigerant in a high-pressure state and provides the refrigerant in a low-pressure state. For example, the expansion means is formed of an electronic expansion valve, the opening degree of which can be controlled to be variable.

The outdoor heat exchanger 38 functions as a condenser of the refrigerant during cooling operation. For example, the outdoor heat exchanger 38 is formed of a cross-fin fin-and-tube heat exchanger including a heat transfer tube and multiple fins.

The refrigerant circuit 11 without a four-way valve is described here. However, if the four-way valve is provided, the outdoor heat exchanger 38 functions as an evaporator of the refrigerant during heating operation.

A sensor that detects the temperature of the refrigerant in a two-phase gas-liquid state may be arranged near the outdoor heat exchanger 38.

Alternatively, a sensor that detects the temperature of the refrigerant in a liquid state or the gas-liquid state may be arranged at the liquid side of the outdoor heat exchanger 38.

An outdoor fan 33 is arranged near the outdoor heat exchanger 38. The outdoor fan 33 has a function of sucking the outdoor air at the outside from an outdoor-air inlet (not shown) and discharging the air, the heat of which is exchanged between the outdoor air and the refrigerant by the outdoor heat exchanger 38, to the outside. The outdoor fan 33 is formed of a fan, the flow rate of the air of which supplied to the outdoor fan 33 can be variable. The outdoor fan 33 is particularly formed of, for example, a centrifugal fan or a multi-fin fan that is driven by an outdoor fan driving unit 34 formed of a DC fan motor.

The compressor 31, the indoor fan 35, the expansion means 37, and the outdoor fan 33 are controlled by the air-conditioning inverter device 21 in accordance with the detection values of the above-described various sensors.

Regarding the flow of the refrigerant during dehumidifying operation, for example, the air-conditioning inverter device 21 causes the refrigerant to be compressed in a high-temperature and high-pressure state by the compressor 31, the compressed refrigerant to be condensed for heat transfer by the outdoor heat exchanger 38, the heat-transferred refrigerant to be reduced in pressure by the expansion means 37, the refrigerant to be evaporated for heat removal by the indoor heat exchanger 36, and the refrigerant to be returned to the compressor 31 again.

At this time, regarding the flow of the air, the air-conditioning inverter device 21 causes the indoor air to be sucked from the air inlet (not shown), the air to be cooled and dehumidified by the indoor heat exchanger 36, then the air to be heated by the outdoor heat exchanger 38, and the air to be output by the indoor fan 35 to the indoor again from an air outlet (not shown). Drain water generated when the indoor air is dehumidified by the indoor heat exchanger 36 passes through a discharge water pipe (not shown), is stored in a tank (not shown), and is discharged to the outside from the tank.

To be specific, the above-described air-conditioning inverter device 21 determines the opening degree of the expansion means 37, the rotation speed of the compressor 31, the rotation speed of the indoor fan 35, the rotation speed of the outdoor fan 33, and other values, based on the various data detected by an outdoor-air temperature sensor (not shown), an indoor temperature sensor (not shown), and an indoor humidity sensor (not shown), and various preset data; and adjusts the cooling capacity and the dehumidifying capacity by increasing and decreasing the air-conditioning capacity of the refrigerant circuit 11 based on determined various parameters.

The above-described refrigerant circuit 11 is assembled in each of air-conditioning systems 51 to 55 (described later), and conditions the indoor air.

For example, the refrigerant circuit 11 may be formed such that the indoor heat exchanger 36 and the indoor fan 35 are housed in a housing (not shown) of an indoor unit (described later), and the compressor 31, the outdoor heat exchanger 38, the outdoor fan 33, the expansion means 37, and the air-conditioning inverter device 21 are housed in a housing (not shown) of an outdoor unit (described later).

The form in which the refrigerant circuit 11 is assembled in each of the air-conditioning systems 51 to 55 is not particularly limited.

Figure 2:
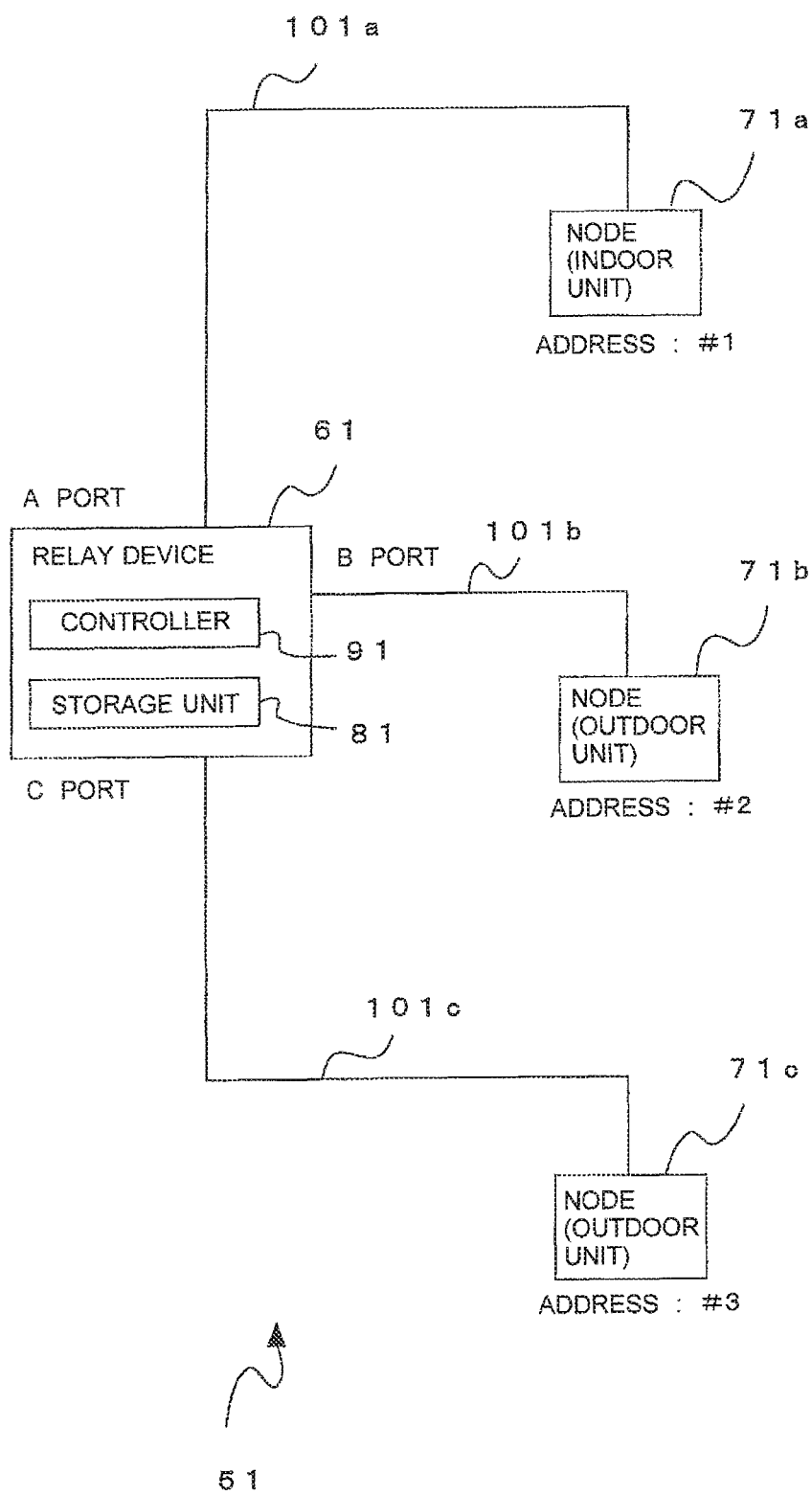
FIG. 2 shows an example configuration of an air-conditioning system 51 according to Embodiment 1 of the invention.

FIG. 2 shows an example configuration of an air-conditioning system 51 according to Embodiment 1 of the invention.

As shown in FIG. 2, the air-conditioning system 51 conditions the indoor air such that a relay device 61, nodes 71a, 71b, and 71c, and other components are associated with each other. At this time, communication is mutually made for various data.

The relay device 61 has a relay function of transferring a communication frame supplied from one of the nodes 71a, 71b, and 71c to a transfer destination.

To be specific, the relay device 61 includes an A port, a B port, a C port, a storage unit 81, and a controller 91.

For example, the storage unit 81 temporarily stores data by using a re-writable RAM (Random Access Memory). Also, the storage unit 81 stores codes and so force corresponding to processing programs, parameters, and various dip switches (not shown) by using a ROM (Read Only Memory) from which data can be only read. That is, the storage unit 81 includes the RAM and the ROM.

Also, the storage unit 81 holds a data table, which will be described later with reference to FIG. 3. That is, the storage unit 81 has set therein a data table, which will be described later with reference to FIG. 3.

The controller 91 reads, for example, a processing program from the storage unit 81, and executes the processing program based on the frequency of a pulse generator (not shown) that supplies a constant clock. Also, when a dip switch or the like (not shown) is operated by, for example, a person who installs the relay device 61, the controller 91 changes the setting of the relay device 61 in response to the operation, and supplies the operation result of the dip switch or the like to a display or the like (not shown).

The A port is a communication port, and has a logical connection relationship with a communication network 101a. That is, when communication between the relay device 61 and the communication network 101a is established through the A port, the relay device 61 can make mutual communication with the node 71a on the communication network 101a.

The B port is a communication port, and has a logical connection relationship with a communication network 101b. That is, when communication between the relay device 61 and the communication network 101b is established through the B port, the relay device 61 can make mutual communication with the node 71b on the communication network 101b.

The C port is a communication port, and has a logical connection relationship with a communication network 101c. That is, when communication between the relay device 61 and the communication network 101c is established through the C port, the relay device 61 can make mutual communication with the node 71c on the communication network 101c.

The example in which the relay device 61 includes the three communication ports has been described here; however, it is not limited thereto.

For example, the relay device 61 may include two communication ports.

Alternatively, for example, the relay device 61 may include multiple communication ports of four or more.

The communication network 101a is a communication medium, and has the logical connection relationship with the A port serving as the communication port.

As long as the communication network 101a has the logical connection relationship with the A port, the specific communication form is not particularly limited.

For example, the communication network 101a may have a wired communication form by copper wires or the like. To be specific, the communication network 101a may be formed by arranging a LAN cable in conformity with the Ethernet standard.

Alternatively, for example, the communication network 101a may have a wireless communication form by radio waves or the like. To be specific, the communication network 101a may have a wireless communication form in conformity with IEEE 802.11, which is one of wireless LAN standards.

Alternatively, for example, the communication network 101a may be formed by Wi-Fi (registered trademark of Wi-Fi Alliance) in conformity with IEEE 802.11i.

Alternatively, for example, the communication network 101a may have a communication form by optical communication with optical fibers or the like. To be specific, the communication network 101a may have a communication form in conformity with IEEE 802.15.7, which is one of communication standards.

In other words, the relay device 61 has the logical connection relationship with the node 71a through the A port and the communication network 101a.

The communication network 101b is a communication medium, and has the logical connection relationship with the B port serving as the communication port.

As long as the communication network 101b has the logical connection relationship with the B port, the specific communication form is not particularly limited.

For example, the communication network 101b may have a wired communication form by copper wires or the like. To be specific, the communication network 101b may be formed by arranging a LAN cable in conformity with the Ethernet standard.

Alternatively, for example, the communication network 101b may have a wireless communication form by radio waves or the like. To be specific, the communication network 101b may have a wireless communication form in conformity with IEEE 802.11, which is one of wireless LAN standards. Alternatively, for example, the communication network 101b may be formed by Wi-Fi (registered trademark of Wi-Fi Alliance) in conformity with IEEE 802.11i.

Alternatively, for example, the communication network 101b may have a communication form by optical communication with optical fibers or the like. To be specific, the communication network 101b may have a communication form in conformity with IEEE 802.15.7, which is one of communication standards.

In other words, the relay device 61 has the logical connection relationship with the node 71b through the B port and the communication network 101b.

The communication network 101c is a communication medium, and has the logical connection relationship with the C port serving as the communication port.

As long as the communication network 101c has the logical connection relationship with the C port, the specific communication form is not particularly limited.

For example, the communication network 101c may have a wired communication form by copper wires or the like. To be specific, the communication network 101c may be formed by arranging a LAN cable in conformity with the Ethernet standard.

Alternatively, for example, the communication network 101c may have a wireless communication form by radio waves or the like. To be specific, the communication network 101c may have a wireless communication form in conformity with IEEE 802.11, which is one of wireless LAN standards.

Alternatively, for example, the communication network 101c may be formed by Wi-Fi (registered trademark of Wi-Fi Alliance) in conformity with IEEE 802.11i.

Alternatively, for example, the communication network 101c may have a communication form by optical communication with optical fibers or the like. To be specific, the communication network 101c may have a communication form in conformity with IEEE 802.15.7, which is one of communication standards.

In other words, the relay device 61 has the logical connection relationship with the node 71c through the C port and the communication network 101c.

The communication networks 101a, 101b, and 101c are collectively called communication network 101 unless one of the communication networks 101a, 101b, and 101c is particularly distinguished from the others in reference thereto.

Also, the example with the three communication networks has been described here; however, the present invention is not limited thereto.

For example, less than three communication networks may be present.

Alternatively, for example, four or more communication networks may be present.

The node 71a has the logical connection relationship with the communication network 101a, and is an abstract form of a logical component that forms a network.

For example, a concrete form of the node 71a is an indoor unit. In this case, the node 71a corresponds to the indoor unit. That is, the node 71a that is of an abstract concept is specifically associated with the indoor unit.

An address is allocated to the node 71a for operation of the air-conditioning system 51. For example, the node 71a has an address #1 set as a communication address of the node 71a.

In the above description, the example in which the node 71a is associated with the indoor unit and the address #1 is set as the communication address. However, the present embodiment is not limited thereto.

For example, the node 71a may be associated with any of an outdoor unit, a remote controller (described later), and a centralized management device (described later).

Alternatively, for example, a communication address in conformity with a communication standard may be allocated as the communication address to the node 71a. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71a is uniquely determined on the communication network 101a.

The node 71b has the logical connection relationship with the communication network 101b, and is an abstract form of a logical component that forms a network.

For example, a concrete form of the node 71b is an outdoor unit. In this case, the node 71b corresponds to the outdoor unit. That is, the node 71b of an abstract concept is associated with, specifically, the outdoor unit.

An address is allocated to the node 71b for operation of the air-conditioning system 51. For example, the node 71b has an address #2 set as a communication address of the node 71b.

In the above description, the example in which the node 71b is associated with the outdoor unit and the address #2 is set as the communication address. However, the present invention is not limited thereto.

For example, the node 71b may be associated with any of an indoor unit, a remote controller (described later), and a centralized management device (described later).

Alternatively, for example, a communication address in conformity with a communication standard may be allocated as the communication address to the node 71b. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71b is uniquely determined on the communication network 101b.

The node 71c has the logical connection relationship with the communication network 101c, and is an abstract form of a logical component that forms a network.

For example, a concrete form of the node 71c is an outdoor unit. In this case, the node 71c corresponds to the outdoor unit. That is, the node 71c of an abstract concept is specifically associated with the outdoor unit.

An address is allocated to the node 71c for operation of the air-conditioning system 51. For example, the node 71c has an address #3 set as a communication address of the node 71c.

In the above description, the example in which the node 71c is associated with the outdoor unit and the address #3 is set as the communication address. However, the present invention is not limited thereto.

For example, the node 71c may be associated with any of an indoor unit, a remote controller (described later), and a centralized management device (described later).

Alternatively, for example, a communication address in conformity with a communication standard may be allocated as the communication address to the node 71c. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71c is uniquely determined on the communication network 101c.

FIG. 2 describes the logical connection relationships among the relay device 61, and the nodes 71a, 71b, and 71c. That is, a network topology is described, not a physical connection relationship.

The relay device 61 may be actually physically mounted at any location. This is similarly applied to respective configurations described later with reference to FIGS. 7, 12, 15, and 18.

For example, the function of the relay device 61 may be installed on a control substrate embedded in an outdoor unit, and processing (described later) may be executed.

Alternatively, for example, the function of the relay device 61 may be provided to a control substrate embedded in an indoor unit, and processing (described later) may be executed.

Alternatively, for example, the function of the relay device 61 may be installed on a control substrate embedded in a remote controller (described later), and processing (described later) may be executed.

Alternatively, for example, the function of the relay device 61 may be provided to a control substrate embedded in a centralized management device (described later), and processing (described later) may be executed.

The nodes 71a, 71b, and 71c are collectively called node 71 unless one of the nodes 71a, 71b, and 71c is particularly distinguished from the others.

Also, the example of the three nodes has been described here. However, the number of nodes is not particularly limited, and may be less than three or more than three.

Next, an example of a communication form between the relay device 61 and the node 71a is described.

The relay device 61 and the node 71a establish connection through the communication network 101a.

The relay device 61 and the node 71a mutually transfer a communication frame after the establishment of the connection.

The relay device 61 and the node 71a cut the connection after the communication for mutually transferring the communication frame is ended.

The communication frame to be transmitted and received is, for example, operation data acquired during operation of the air-conditioning system 51.

To be specific, the operation data encapsulated in the communication frame is the indoor temperature, the operating frequency of the compressor 31, and so forth.

To be more specific, a single communication frame is formed by adding, for example, a transmission source address and a transmission destination address to the operation data. The formed communication frame is transmitted and received on the communication network 101.

Alternatively, the operation data of the communication frame may be divided into predetermined-size segments as packets, and a transmission source address, a transmission destination address, and so forth may be added to each packet.

In this case, plural segmented packets are successively transmitted on a packet basis to locations designated by the transmission destination addresses.

FIG. 3 shows an example configuration of a data table held in the relay device 61 according to Embodiment 1 of the invention.

As shown in FIG. 3, the data table is formed of data relating to the node 71.

To be specific, the data table is formed of data relating to the node 71a on the communication network 101a at the A port side, data relating to the node 71b on the communication network 101b at the B port side, and data relating to the node 71c on the communication network 101c at the C port side.

First, the data table relating to the A port side is described.

In the data table, a pair, the pair comprising communication address data and model data, is set as data relating to the node 71a.

The model data mentioned here is, for example, a specific component, such as an indoor unit or an outdoor unit, forming an air-conditioning system.

For example, as shown in FIG. 3, for the node 71a forming the logical communication relationship with the communication network 101a at the A port side, the address #1 is set as the communication address, and the model data is set as the indoor unit.

Next, the data table relating to the B port side is described.

In the data table, a pair, the pair comprising communication address data and model data, is set as data relating to the node 71b.

The model data mentioned here is, for example, a specific component, such as an indoor unit or an outdoor unit, forming an air-conditioning system.

For example, as shown in FIG. 3, for the node 71b forming the logical communication relationship with the communication network 101b at the B port side, the address #2 is set as the communication address, and the model data is set as the outdoor unit.

Next, the data table relating to the C port side is described.

In the data table, a pair, the pair comprising communication address data and model data, is set as data relating to the node 71c.

The model data mentioned here is, for example, a specific component, such as an indoor unit or an outdoor unit, forming an air-conditioning system.

For example, as shown in FIG. 3, for the node 71c forming the logical communication relationship with the communication network 101c at the C port side, the address #3 is set as the communication address, and the model data is set as the outdoor unit.

In other words, in the data table, a communication address of a node 71 and model data associated with the node 71 form a pair, the pair serves as single node information, and the node information is formed on a communication port basis.

For example, node information formed of a pair, the pair comprising a communication address being #1 and model data being the indoor unit is formed at the A port side, node information formed of a pair of a communication address being #2 and model data being the outdoor unit is formed at the B port side, and node information formed of a pair of a communication address being #3 and model data being the outdoor unit is formed at the C port side.

In short, the data table indicates a list of logical connection relationships formed by the respective ports and the respective nodes. This is similarly applied to data tables used in the following description.

The form of the data table is not limited thereto.

For example, a data table may be formed of only communication addresses.

For example, a communication address table including only communication addresses and a model data table including only model data may be previously created, and a mapping table in which the communication address table is associated with the model data table on a one-by-one basis may be created, so that a pair of a communication address and model data can be created.

Alternatively, an integrated form of the communication address table, the model data table, and the mapping table may define a data table.

Also, the data in the data table is previously stored in the storage unit 81 before operation of the air-conditioning system 51. Alternatively, data in the data table may be set when the data of the data table is supplied from a certain node 71 during operation of the air-conditioning system 51.

Figure 4:
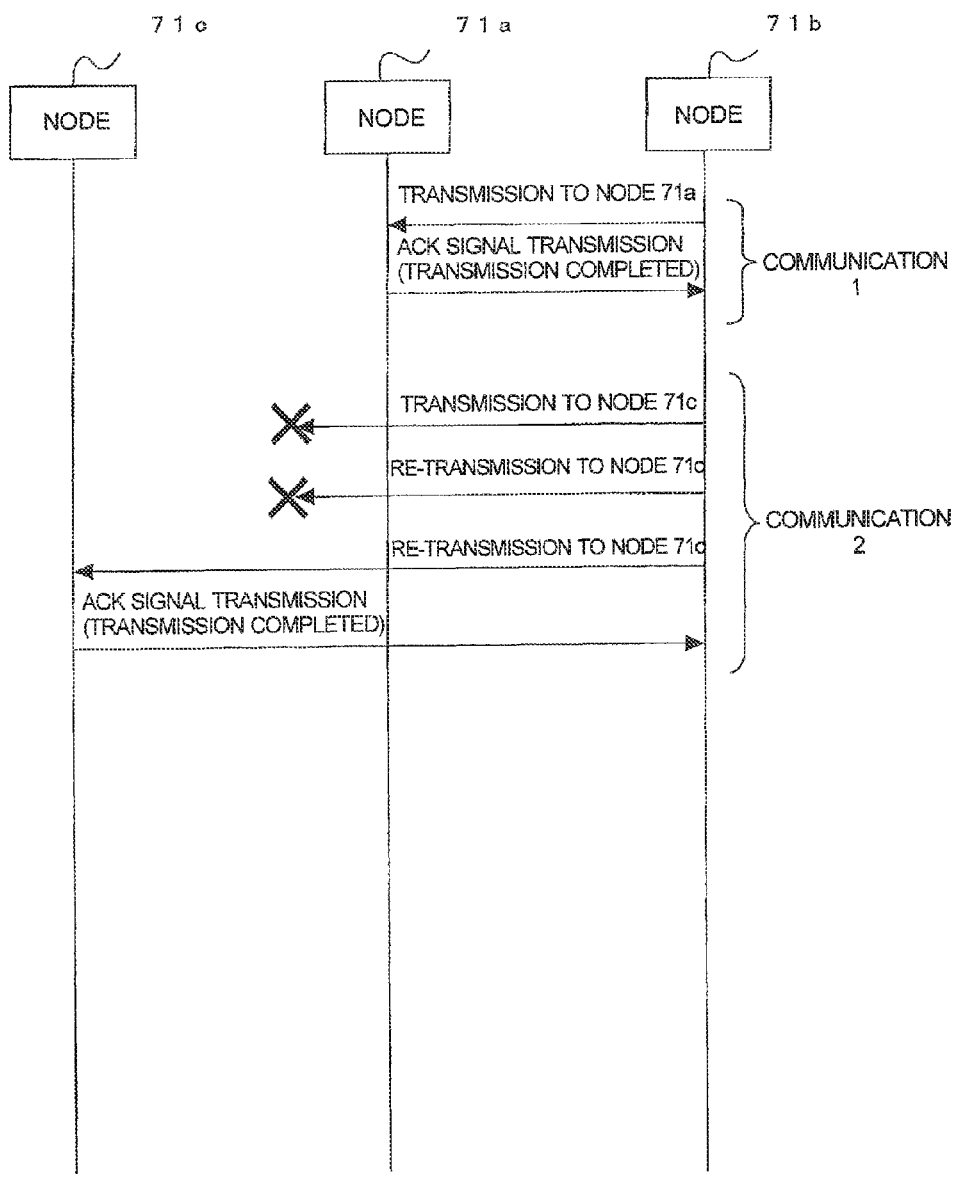
FIG. 4 is a sequence showing an example operation of the air-conditioning system 51 described while the relay device 61 is hidden according to Embodiment 1 of the invention.

FIG. 4 is a sequence showing an example operation of the air-conditioning system 51 described while the relay device 61 is hidden according to Embodiment 1 of the invention.

As shown in FIG. 4, communication 1 is data transmission from the node 71b to the node 71a, and communication 2 is data transmission from the node 71b to the node 71c.

The details of the communication 1 and the communication 2 are described below.

Communication 1

Processing of the communication 1 is described.

First, the node 71b transmits a communication frame to the node 71a.

Then, the node 71a receives the communication frame transmitted from the node 71b, and then transmits an ACK signal to the node 71b.

Then, the node 71b receives the ACK signal transmitted from the node 71a, and completes transmission processing.

In this way, the processing of the communication 1 is executed.

Communication 2

Processing of the communication 2 is described.

First, the node 71b transmits a communication frame to the node 71c.

Then, since the node 71b does not receive an ACK signal from the node 71c of a transmission destination for a predetermined period, the node 71b re-transfers the same communication frame to the node 71c.

Then, since the node 71b has not received any ACK signal from the node 71c that is the transmission destination for the predetermined period, the node 71b re-transfers the same communication frame to the node 71c.

Then, the node 71c receives the communication frame re-transmitted from the node 71b.

Then, since the node 71c receives the communication frame re-transmitted from the node 71b, the node 71c transmits the ACK signal to the node 71b, which is a transmission source.

Then, the node 71b receives the ACK signal transmitted from the node 71c, and completes transmission processing.

In this way, the processing of the communication 2 is executed.

That is, if the ACK signal is not received from the transmission destination, re-transmission processing is normally repeatedly executed.

When the node 71 of the transmission destination or the node 71 of the transmission source is determined, a transmission-destination address or a transmission-source address included in a communication frame may be referenced.

Next, the details of the above-described communication 1 with regard to the operation of the relay device 61 are described with reference to FIG. 5.

Figure 5:
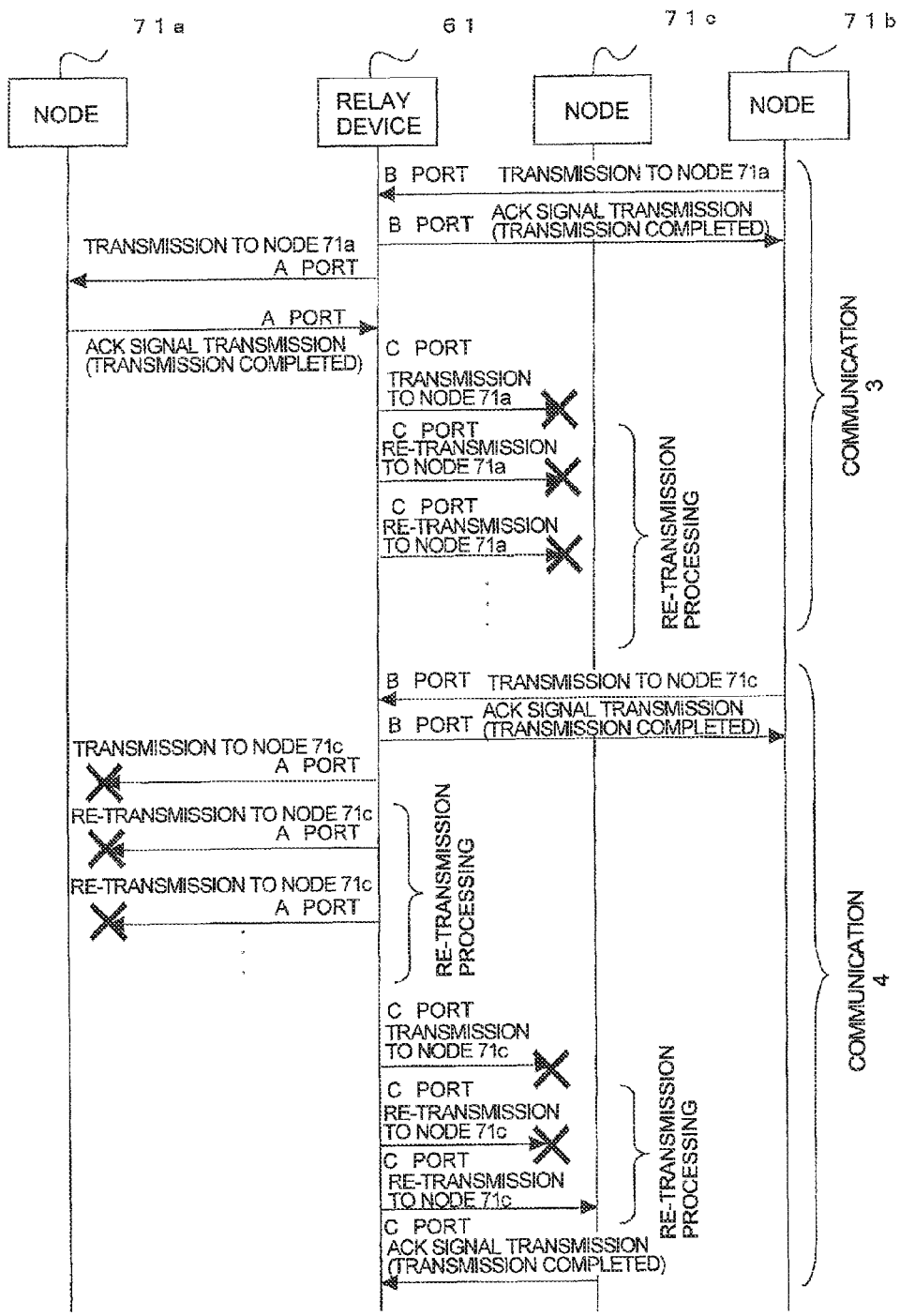
FIG. 5 is a sequence showing an example in which the relay device 61 executes re-transmission processing every time according to Embodiment 1 of the invention.

FIG. 5 is a sequence showing an example processing in which the relay device 61 executes re-transmission processing according to Embodiment 1 of the invention.

As shown in FIG. 5, communication 3 is data transmission from the node 71b to the node 71a, and communication 4 is data transmission from the node 71b to the node 71c.

The details of the communication 3 and the communication 4 are successively described below.

Communication 3

Processing of the communication 3 is described.

The node 71b transmits a communication frame to the node 71a.

The relay device 61 receives the communication frame transmitted from the node 71b at the B port, and then transmits an ACK signal from the B port to the node 71b.

The node 71b receives the ACK signal from the relay device 61, and then completes transmission processing of the own node.

The relay device 61 transmits the communication frame to the node 71a, the communication frame received from the node 71b, from the A port having the connection relationship with the node 71a and the C port having the connection relationship with the node 71c.

Processing at the A port side is described.

The relay device 61 transfers the communication frame from the A port to the node 71a.

The node 71a receives the communication frame bounded for the own node transferred from the relay device 61.

The node 71a transmits an ACK signal to the relay device 61.

The relay device 61 receives the ACK signal from the node 71a, and then completes transmission processing of transferring the communication frame to the node 71a.

Processing at the C port side is described.

The relay device 61 transmits the communication frame to the node 71a from the C port.

Since the relay device 61 has not received any ACK signal from the node 71a that is the transmission destination for a predetermined period, the relay device 61 re-transfers the same communication frame to the node 71*a* from the C port.

Since the relay device 61 has not received any ACK signal from the node 71*a* that is the transmission destination for the predetermined period, the relay device 61 re-transfers the same communication frame to the node 71*a* from the C port.

Such re-transmission processing is normally executed a predetermined number of times, for example, three times.

In this way, the processing of the communication 3 is executed.

In the above description, the processing at the A port side is described and then the processing at the C port side is described for convenience of description; however, the processing does not have to be successively executed as described above, and the processing may be executed in parallel.

Also, in the above description, the example, in which the number of times of the re-transmission processing is three, is described. However, the number of times is not limited thereto. For example, the number of times of the re-transmission processing may be less than three, or four or more. The number of times of the re-transmission processing may be varied in accordance with the state of communication traffic. For example, if the communication traffic is crowded, the number of re-transmission times may be set at a small number, and if the communication traffic is not crowded, the number of re-transmission times may be set at a large number.

Communication 4

Processing of the communication 4 is described.

The node 71*b* transmits a communication frame to the node 71*c*.

The relay device 61 receives the communication frame transmitted from the node 71*b* at the B port, and then transmits an ACK signal from the B port to the node 71*b*.

The node 71*b* receives the ACK signal from the relay device 61, and then completes transmission processing of the own node.

The relay device 61 transmits the communication frame to the node 71*c*, the communication frame received from the node 71*b*, from the A port having the connection relationship with the node 71*a* and the C port having the connection relationship with the node 71*c*.

Processing at the A port side is described.

The relay device 61 transmits the communication frame to the node 71*c* from the A port.

Since the relay device 61 does not receive an ACK signal from the node 71*c* that is the transmission destination for a predetermined period, the relay device 61 re-transfers the same communication frame to the node 71*c* from the A port.

Such re-transmission processing is normally executed a predetermined number of times, for example, three times.

Processing at the C port side is described.

The relay device 61 transfers the communication frame to the node 71*c* from the C port.

Since the relay device 61 has not received any ACK signal from the node 71*c* that is the transmission destination for the predetermined period, the relay device 61 re-transfers the same communication frame to the node 71*c* from the C port.

Since the relay device 61 has not received any ACK signal from the node 71*c* that is the transmission destination after the re-transmission processing for the predetermined period, the relay device 61 re-transfers the same communication frame to the node 71*c* from the C port.

The node 71*c* receives the communication frame bounded for the own node transferred from the relay device 61.

The node 71*c* transmits the ACK signal to the relay device 61.

The relay device 61 receives the ACK signal from the node 71*c*, and then completes transmission processing of transferring the communication frame to the node 71*c*.

In this way, the processing of the communication 4 is executed.

In the above description, the processing at the A port side is described and then the processing at the C port side is described for convenience of description; however, the processing does not have to be successively executed as described above, and the processing may be executed in parallel.

Also, in the above description, the example, in which the number of times of the re-transmission processing is three, is described. However, the number is not limited to three. For example, the number of times of the re-transmission processing may be less than three, or four or more. The number of times of the re-transmission processing may be varied in accordance with the state of communication traffic. For example, if the communication traffic is crowded, the number of re-transmission times may be set at a small number, and if the communication traffic is not crowded, the number of re-transmission times may be set at a large number.

As described above, in the processing of the communication 3 and the processing of the communication 4, the re-transmission processing is repeatedly executed. Hence, the communication traffic on the network of the air-conditioning system 51 increases.

If the re-transmission processing is uniformly repeatedly executed as described above, communication quality is ensured. However, actually in some cases, the re-transmission processing may not be required.

For example, if the node of the transmission destination is not registered, even if the re-transmission processing is repeatedly executed, the ACK signal is not returned.

Hence, the processing, in which if the node of the transmission destination is not registered, the re-transmission processing is not executed, and if the node of the transmission destination is registered, the re-transmission processing is executed, is described with reference to FIG. 6.

Figure 6:
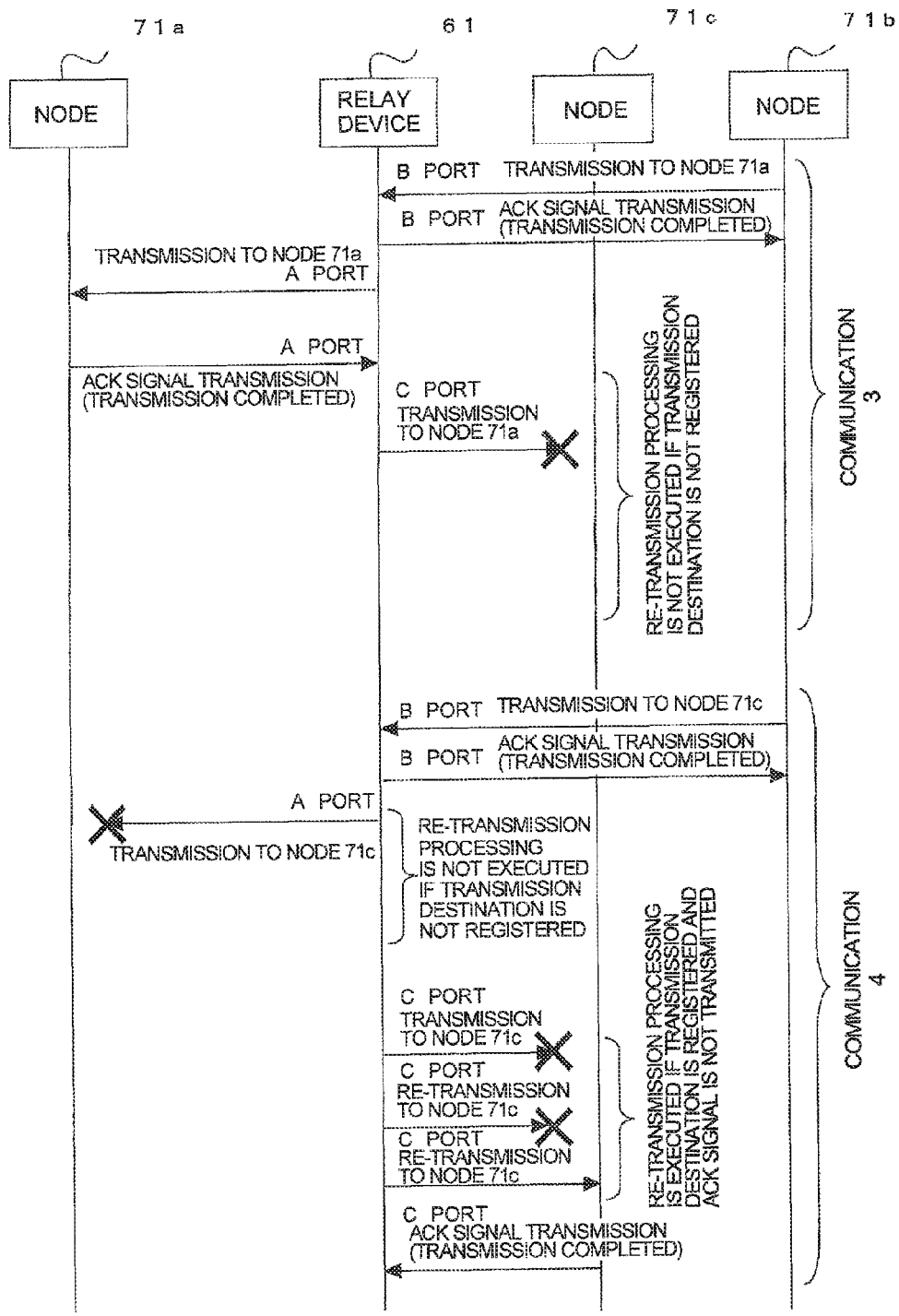
FIG. 6 is a sequence showing an example in which the relay device 61 may not execute the re-transmission processing according to Embodiment 1 of the invention.

FIG. 6 is a sequence showing an example processing in which the relay device 61 does not execute the re-transmission processing according to Embodiment 1 of the invention.

As shown in FIG. 6, communication 3 is data transmission from the node 71*b* to the node 71*a*, and communication 4 is data transmission from the node 71*b* to the node 71*c*.

The details of the communication 3 and the communication 4 are described below.

Communication 3

Processing of the communication 3 is described.

The node 71*b* transmits a communication frame to the node 71*a*.

The relay device 61 receives the communication frame transmitted from the node 71*b* at the B port, and then transmits an ACK signal to the node 71*b* from the B port.

The node 71*b* receives the ACK signal from the relay device 61, and then completes transmission processing of the own node.

The relay device 61 transmits the communication frame to the node 71*a*, the communication frame received from the node 71*b*, from the A port having the connection relationship with the node 71*a* and the C port having the connection relationship with the node 71*c*.

Processing at the A port side is described.

The relay device 61 transfers the communication frame to the node 71*a* from the A port.

The node 71*a* receives the communication frame bounded for the own node transferred from the relay device 61.

The node 71*a* transmits an ACK signal to the relay device 61.

The relay device 61 receives the ACK signal from the node 71*a*, and then completes transmission processing of transferring the communication frame to the node 71*a*.

Processing at the C port side is described.

The relay device 61 transmits the communication frame to the node 71*a* from the C port.

The relay device 61 has not received any ACK signal from the node 71*a* that is the transmission destination for the predetermined period; however, the node 71*a* that is the transmission destination is not registered in the data table relating to the C port side. Hence, in this case, the processing of re-transmitting the same communication frame to the node 71*a* from the C port is not executed.

That is, if the node of the transmission destination is not registered, even though the relay device 61 has not received any ACK signal from the node 71*a* that is the transmission destination for the predetermined period, the relay device 61 does not execute the processing of re-transmitting the same communication frame to the node 71*a* from the C port.

In other words, if the transfer destination of the communication frame bounded for transfer processing is not registered, the relay device 61 sets the number of re-transmission times at zero.

In this way, the processing of the communication 3 is executed.

In the above description, the processing at the A port side is described and then the processing at the C port side is described for convenience of description; however, the processing does not have to be successively executed as described above, and the processing may be executed in parallel.

Communication 4

Processing of the communication 4 is described.

The node 71*b* transmits a communication frame to the node 71*c*.

The relay device 61 receives the communication frame transmitted from the node 71*b* at the B port, and then transmits an ACK signal from the B port to the node 71*b*.

The node 71*b* receives the ACK signal from the relay device 61, and then completes transmission processing of the own node.

The relay device 61 transmits the communication frame to the node 71*c*, the communication frame received from the node 71*b*, from the A port having the connection relationship with the node 71*a* and the C port having the connection relationship with the node 71*c*.

Processing at the A port side is described.

The relay device 61 transmits the communication frame to the node 71*c* from the A port.

The relay device 61 does not receive an ACK signal from the node 71*c* that is the transmission destination for the predetermined period; however, the node 71*c* that is the transmission destination is not registered in the data table relating to the A port side. Hence, in this case, the processing of re-transmitting the same communication frame to the node 71*c* from the A port is not executed.

That is, if the node of the transmission destination is not registered, even though the relay device 61 has not received any ACK signal from the node 71*c* that is the transmission destination for the predetermined period, the relay device 61 does not execute the processing of re-transmitting the same communication frame to the node 71*c* from the A port.

Processing at the C port side is described.

The relay device 61 transfers the communication frame from the C port to the node 71*c*.

The relay device 61 has not received any ACK signal from the node 71*c* that is the transmission destination for the predetermined period. However, the node 71*c* that is the transmission destination is registered in the data table relating to the C port side. Hence, in this case, the processing of re-transmitting the same communication frame to the node 71*c* from the C port is executed.

That is, if the node of the transmission destination is registered, even though the relay device 61 has not received any ACK signal from the node 71*c* that is the transmission destination for the predetermined period, the relay device 61 executes the processing of re-transmitting the same communication frame to the node 71*c* from the C port.

In other words, the relay device 61 sets the number of re-transmission times at a preset threshold number of times if the transfer destination of the communication frame is registered. The threshold number of times may be smaller or larger than the number of normal transmission times. Here, it is temporarily assumed that the threshold number of times is set at a value smaller than the number of normal re-transmission times.

For example, as described above, if the number of times of normal re-transmission processing is set at three, the threshold number of times is two. However, it is not limited to two.

For example, if the communication traffic is crowded, the number of normal re-transmission times may be set at a small number, and if the communication traffic is not crowded, the number of re-transmission times may be set at a large number.

Hence, the threshold number of times may be also set at a different value in association with the number of normal re-transmission times, depending on the crowded degree of the communication traffic.

Alternatively, the threshold number of times may not be associated with the number of normal re-transmission times, and may be set as a fixed value.

Since the relay device 61 has not received any ACK signal from the node 71*c* that is the transmission destination after the re-transmission processing for the predetermined period, the relay device 61 re-transfers the same communication frame to the node 71*c* from the C port.

The node 71*c* receives the communication frame bounded for the own node transferred from the relay device 61.

The node 71*c* transmits the ACK signal to the relay device 61. The relay device 61 receives the ACK signal from the node 71*c*, and then completes transmission processing of transferring the communication frame to the node 71*c*.

In this way, the processing of the communication 4 is executed.

In the above description, the processing at the A port side is described and then the processing at the C port side is described for convenience of description; however, the processing does not have to be successively executed as described above, and the processing may be executed in parallel.

Also, in the above description, the period in which the ACK signal is not received is the predetermined period. The predetermined period mentioned here is, for example, three seconds. However, it is not limited to three seconds.

In this way, if the re-transmission processing has a limitation, the re-transmission processing is not uniformly repeatedly executed in the processing of the communication 3 and the processing of the communication 4.

Hence, the communication traffic on the network of the air-conditioning system 51 is not increased more than is necessary.

That is, the communication traffic of the communication network 101 in the air-conditioning system 51 can be decreased.

Further, as described above, the transmission frame is transferred at least once regardless of the contents of the data table relating to each port side.

That is, the relay device 61 outputs the communication frame from the corresponding communication port to each node of the communication network 101 having the connection relationship with this communication port.

Hence, the communication contents of the entire air-conditioning system 51 can be monitored at any position on the communication network 101 of the air-conditioning system 51.

The reason of that reliability of communication is not degraded even if the re-transmission processing is not executed when the ACK signal is not transmitted is described here.

In general, there are expected two reasons of that communication is not established.

The first reason is that the communication is not established at a certain probability due to a noise or the like.

The second reason is that the communication is not established at all due to shutoff of the power supply of a node or disconnection of a communication path between nodes.

In such a situation, the relay device 61 executes not only direct communication with the relay device 61 itself, but also processing of registering a node, with which communication has been established for a predetermined period, in a communication-path table with reference to the communication state with other node.

In the communication-path table created as described above, when the communication is not established by the first reason, the probability that a node, which is supposed to be present, is deleted is sufficiently lower than the probability that the re-transmission processing is generated by direct transmission executed for a short period.

Hence, as compared with a case in which the re-transmission processing is continuously executed, the reliability of communication is less likely degraded.

Also, in the communication-path table created as described above, when the communication is not established by the second reason, the probability that a node, which is supposed to be present, is deleted becomes higher than the probability that the re-transmission processing is generated by direct transmission executed for a short period.

However, at this time, the system is stopped in the viewpoint of safety, and the user is immediately notified about the abnormal situation.

Hence, there is no need to suspect about the degradation in reliability of communication.

Hence, even if the re-transmission processing is not executed when the ACK signal is not transmitted, the reliability of communication is not degraded.

As described above, according to Embodiment 1, there is provided the air-conditioning system 51, in which at least one outdoor unit and at least one indoor unit are connected by a refrigerant pipe and operated, and the outdoor unit and the indoor unit make communication through the relay device 61. The air-conditioning system includes the relay device 61 including a plurality of communication ports; the plurality of communication networks 101 having logical connection relationships with the respective communication ports; and the plurality of nodes 71 having logical connection relationships with the respective communication networks 101. The plurality of nodes 71 are each associated with one of the outdoor unit and the indoor unit. Among the plurality of nodes 71, a certain node is set as a first node, and another certain node different from the first node is set as a second node. The relay device 61 executes transfer processing of transferring a communication frame from the first node to the second node, and then if the relay device 61 does not receive a reception acknowledgment signal from the second node, limits a number of re-transmission times when the relay device 61 re-transfers the communication frame to the second node. Accordingly, air-conditioning service can be prevented from being degraded.

Embodiment 2

Embodiment 2 differs from Embodiment 1 in that a plurality of nodes are present in each communication network.

In Embodiment 2, matters which are not particularly written are assumed to be similar to those in Embodiment 1, and the same functions and configurations are described by using the same reference signs.

Description for the same functions and configurations, as those in Embodiment 1 is omitted.

Figure 7:
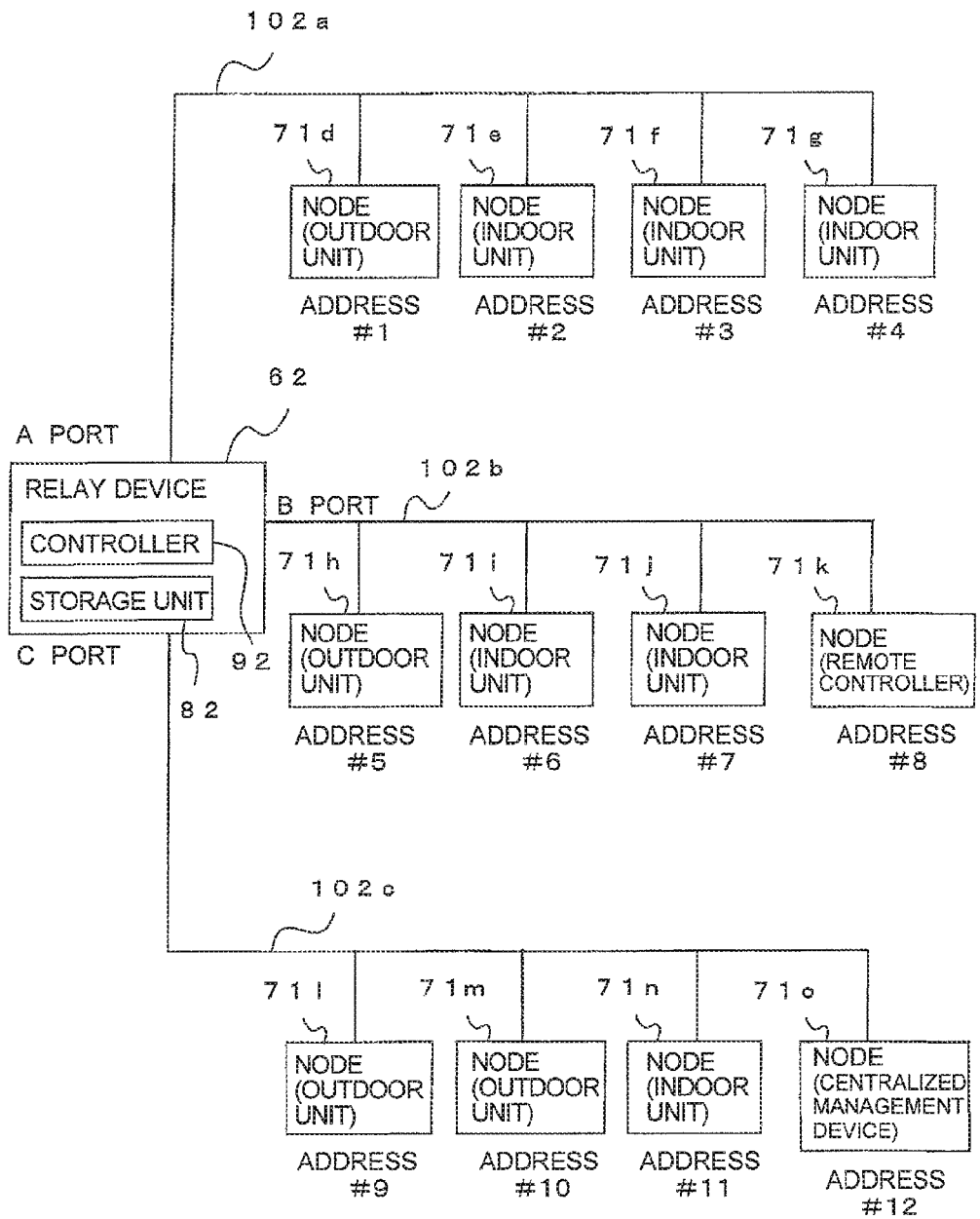
FIG. 7 shows an example configuration of an air-conditioning system 52 according to Embodiment 2 of the invention.

FIG. 7 shows an example configuration of an air-conditioning system 52 according to Embodiment 2 of the invention.

As shown in FIG. 7, the air-conditioning system 52 conditions the indoor air such that a relay device 62, nodes 71d, 71e, 71f, 71g, 71h, 71i, 71j, 71k, 71l, 71m, 71n, and 71o, and other components are associated with each other. At this time, communication is mutually made for various data.

The relay device 62 has a relay function of transferring a communication frame supplied from one of the nodes 71d, 71e, 71f, 71g, 71h, 71i, 71j, 71k, 71l, 71m, 71n, and 71o to a transfer destination.

To be specific, the relay device 62 includes an A port, a B port, a C port, a storage unit 82, and a controller 92.

The storage unit 82 and the controller 92 have functional configurations similar to those of the storage unit 81 and the controller 91 of Embodiment 1, and hence the description thereof is omitted.

The A port is a communication port, and has a logical connection relationship with a communication network 102a. That is, when communication between the relay device 62 and the communication network 102a is established through the A port, the relay device 62 can make mutual communication with the nodes 71d, 71e, 71f, and 71g on the communication network 102a.

The B port is a communication port, and has a logical connection relationship with a communication network 102b. That is, when communication between the relay device 62 and the communication network 102b is established through the B port, the relay device 62 can make mutual communication with the nodes 71h, 71i, 71j, and 71k on the communication network 102b.

The C port is a communication port, and has a logical connection relationship with a communication network 102c. That is, when communication between the relay device 62 and the communication network 102c is established through the C port, the relay device 62 can make mutual communication with the nodes 71l, 71m, 71n, and 71o on the communication network 102c.

The example in which the relay device 62 includes the three communication ports has been described here; however, it is not limited thereto.

For example, the relay device 62 may include two communication ports.

Alternatively, for example, the relay device 62 may include multiple communication ports of four or more.

The communication networks 102a, 102b, and 102c are similar to the communication network 101 of Embodiment 1, and hence the description thereof is omitted.

The communication networks 102a, 102b, and 102c are collectively called communication network 102 unless one of the communication networks 102a, 102b, and 102c is particularly distinguished from the others.

The node 71d has the logical connection relationship with the communication network 102a, and is an abstract form of a logical component that forms a network.

For example, a concrete form of the node 71d is an outdoor unit. In this case, the node 71d corresponds to the outdoor unit. That is, the node 71d of an abstract concept is specifically associated with the outdoor unit.

An address is allocated to the node 71d for operation of the air-conditioning system 52. For example, the node 71d has an address #1 set as a communication address of the node 71d.

In the above description, the example in which the node 71d is associated with the outdoor unit and the address #1 is set as the communication address. However, it is not limited thereto.

For example, the node 71d may be associated with any of an indoor unit, a remote controller (described later), and a centralized management device (described later).

Alternatively, for example, a communication address in conformity with a communication standard may be allocated as the communication address to the node 71d. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71d is uniquely determined on the communication network 102a.

The node 71e has the logical connection relationship with the communication network 102a, and is an abstract form of a logical component that forms a network.

For example, a concrete form of the node 71e is an indoor unit. In this case, the node 71e corresponds to the indoor unit. That is, the node 71e of an abstract concept is specifically associated with the indoor unit.

An address is allocated to the node 71e for operation of the air-conditioning system 52. For example, the node 71e has an address #2 set as a communication address of the node 71e.

In the above description, the example in which the node 71e is associated with the indoor unit and the address #2 is set as the communication address. However, it is not limited thereto.

For example, the node 71e may be associated with any of an outdoor unit, a remote controller (described later), and a centralized management device (described later).

Alternatively, for example, a communication address in conformity with a communication standard may be allocated as the communication address to the node 71e. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71e is uniquely determined on the communication network 102a.

The node 71f has the logical connection relationship with the communication network 102a, and is an abstract form of a logical component that forms a network.

For example, a concrete form of the node 71f is an indoor unit. In this case, the node 71f corresponds to the indoor unit. That is, the node 71f of an abstract concept is specifically associated with the indoor unit.

An address is allocated to the node 71f for operation of the air-conditioning system 52. For example, the node 71f has an address #3 set as a communication address of the node 71f.

In the above description, the example in which the node 71f is associated with the outdoor unit and the address #3 is set as the communication address. However, it is not limited thereto.

For example, the node 71f may be associated with any of an outdoor unit, a remote controller (described later), and a centralized management device (described later).

Alternatively, for example, a communication address in conformity with a communication standard may be allocated as the communication address to the node 71f. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71f is uniquely determined on the communication network 102a.

The node 71g has the logical connection relationship with the communication network 102a, and is an abstract form of a logical component that forms a network.

For example, a concrete form of the node 71g is an indoor unit. In this case, the node 71g corresponds to the indoor unit. That is, the node 71g of an abstract concept is specifically associated with the indoor unit.

An address is allocated to the node 71g for operation of the air-conditioning system 52. For example, the node 71g has an address #4 set as a communication address of the node 71g.

In the above description, the example in which the node 71g is associated with the indoor unit and the address #4 is set as the communication address. However, it is not limited thereto.

For example, the node 71g may be associated with any of an outdoor unit, a remote controller (described later), and a centralized management device (described later).

Alternatively, for example, a communication address in conformity with a communication standard may be allocated as the communication address to the node 71g. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71g is uniquely determined on the communication network 102a.

The node 71h has the logical connection relationship with the communication network 102b, and is an abstract form of a logical component that forms a network.

For example, a concrete form of the node 71h is an outdoor unit. In this case, the node 71h corresponds to the outdoor unit. That is, the node 71b of an abstract concept is specifically associated with the outdoor unit.

An address is allocated to the node 71h for operation of the air-conditioning system 52. For example, the node 71h has an address #5 set as a communication address of the node 71h.

In the above description, the example in which the node 71h is associated with the outdoor unit and the address #5 is set as the communication address. However, it is not limited thereto.

For example, the node 71h may be associated with any of an indoor unit, a remote controller (described later), and a centralized management device (described later).

Alternatively, for example, a communication address in conformity with a communication standard may be allocated as the communication address to the node 71h. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71h is uniquely determined on the communication network 102b.

The node 71i has the logical connection relationship with the communication network 102b, and is an abstract form of a logical component that forms a network.

For example, a concrete form of the node 71i is an indoor unit. In this case, the node 71i corresponds to the indoor unit. That is, the node 71i of an abstract concept is specifically associated with the indoor unit.

An address is allocated to the node 71i for operation of the air-conditioning system 52. For example, the node 71i has an address #6 set as a communication address of the node 71i.

In the above description, the example in which the node 71i is associated with the indoor unit and the address #6 is set as the communication address. However, it is not limited thereto.

For example, the node 71i may be associated with any of an outdoor unit, a remote controller (described later), and a centralized management device (described later).

Alternatively, for example, a communication address in conformity with a communication standard may be allocated as the communication address to the node 71i. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71i is uniquely determined on the communication network 102b.

The node 71j has the logical connection relationship with the communication network 102b, and is an abstract form of a logical component that forms a network.

For example, a concrete form of the node 71j is an indoor unit. In this case, the node 71j corresponds to the indoor unit. That is, the node 71j of an abstract concept is specifically associated with the indoor unit.

An address is allocated to the node 71j for operation of the air-conditioning system 52. For example, the node 71j has an address #7 set as a communication address of the node 71j.

In the above description, the example in which the node 71j is associated with the indoor unit and the address #7 is set as the communication address. However, it is not limited thereto.

For example, the node 71j may be associated with any of an outdoor unit, a remote controller (described later), and a centralized management device (described later).

Alternatively, for example, a communication address in conformity with a communication standard may be allocated as the communication address to the node 71j. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71j is uniquely determined on the communication network 102b.

The node 71k has the logical connection relationship with the communication network 102b, and is an abstract form of a logical component that forms a network.

For example, a concrete form of the node 71k is a remote controller.

The remote controller supplies a signal of an operation instruction from a user or the like to an indoor unit, an outdoor unit, or other device.

In this case, the node 71k corresponds to the remote controller. That is, the node 71k of an abstract concept is specifically associated with the remote controller.

An address is allocated to the node 71k for operation of the air-conditioning system 52. For example, the node 71k has an address #8 set as a communication address of the node 71k.

In the above description, the example in which the node 71k is associated with the remote controller and the address #8 is set as the communication address. However, it is not limited thereto.

For example, the node 71k may be associated with any of an indoor unit, an outdoor unit, and a centralized management device (described later).

Alternatively, for example, a communication address in conformity with a communication standard may be allocated as the communication address to the node 71k. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71k is uniquely determined on the communication network 102b.

The node 71l has the logical connection relationship with the communication network 102c, and is an abstract form of a logical component that forms a network.

For example, a concrete form of the node 71l is an outdoor unit. In this case, the node 71l corresponds to the outdoor unit. That is, the node 71l of an abstract concept is specifically associated with the outdoor unit.

An address is allocated to the node 71l for operation of the air-conditioning system 52. For example, the node 71l has an address #9 set as a communication address of the node 71l.

In the above description, the example in which the node 71l is associated with the outdoor unit and the address #9 is set as the communication address. However, it is not limited thereto.

For example, the node 71l may be associated with any of an indoor unit, a remote controller, and a centralized management device (described later).

Alternatively, for example, a communication address in conformity with a communication standard may be allocated as the communication address to the node 71l. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71*l* is uniquely determined on the communication network 102*c*.

The node 71*m* has the logical connection relationship with the communication network 102*c*, and is an abstract form of a logical component that forms a network.

For example, a concrete form of the node 71*m* is an outdoor unit. In this case, the node 71*m* corresponds to the outdoor unit. That is, the node 71*m* of an abstract concept is specifically associated with the outdoor unit.

An address is allocated to the node 71*m* for operation of the air-conditioning system 52. For example, the node 71*m* has an address #10 set as a communication address of the node 71*m*.

In the above description, the example in which the node 71*m* is associated with the outdoor unit and the address #10 is set as the communication address. However, it is not limited thereto.

For example, the node 71*m* may be associated with any of an indoor unit, a remote controller, and a centralized management device (described later).

Alternatively, for example, a communication address in conformity with a communication standard may be allocated as the communication address to the node 71*m*. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71*m* is uniquely determined on the communication network 102*c*.

The node 71*n* has the logical connection relationship with the communication network 102*c*, and is an abstract form of a logical component that forms a network.

For example, a concrete form of the node 71*n* is an indoor unit. In this case, the node 71*n* corresponds to the indoor unit. That is, the node 71*n* of an abstract concept is specifically associated with the indoor unit.

An address is allocated to the node 71*n* for operation of the air-conditioning system 52. For example, the node 71*n* has an address #11 set as a communication address of the node 71*n*.

In the above description, the example in which the node 71*n* is associated with the indoor unit and the address #11 is set as the communication address. However, it is not limited thereto.

For example, the node 71*n* may be associated with any of an outdoor unit, a remote controller, and a centralized management device (described later).

Alternatively, for example, a communication address in conformity with a communication standard may be allocated as the communication address to the node 71*n*. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71*n* is uniquely determined on the communication network 102*c*.

The node 71*o* has the logical connection relationship with the communication network 102*c*, and is an abstract form of a logical component that forms a network.

For example, a concrete form of the node 71*o* is a centralized management device.

The centralized management device manages the communication network 102.

In this case, the node 71*o* corresponds to the centralized management device. That is, the node 71*o* of an abstract concept is specifically associated with the centralized management device.

An address is allocated to the node 71*o* for operation of the air-conditioning system 52. For example, the node 71*o* has an address #12 set as a communication address of the node 71*o*.

In the above description, the example in which the node 71*o* is associated with the centralized management device and the address #12 is set as the communication address. However, it is not limited thereto.

For example, the node 71*o* may be associated with any of an indoor unit, an outdoor unit, and a remote controller.

Alternatively, for example, a communication address in conformity with a communication standard may be allocated as the communication address to the node 71*o*. To be specific, the communication address may be a communication address in conformity with a TCP/IP protocol. Alternatively, the communication address may be a communication address based on a communication protocol in conformity with PLC (Programmable Logic Controller).

The communication address may be any type as long as the node 71*o* is uniquely determined on the communication network 102*c*.

The nodes 71*d*, 71*e*, 71*f*, 71*g*, 71*h*, 71*i*, 71*j*, 71*k*, 71*l*, 71*m*, 71*n*, and 71*o* are collectively called node 71 unless one of the nodes 71*d*, 71*e*, 71*f*, 71*g*, 71*h*, 71*i*, 71*j*, 71*k*, 71*l*, 71*m*, 71*n*, and 71*o* is particularly distinguished from the others.

Also, the example of the nodes 71 being the 12 nodes has been described here. However, the number of nodes 71 is not particularly limited, and may be less than 12 or more than 12.

The communication form between the relay device 62 and each node is similar to that of Embodiment 1, and hence the description thereof is omitted.

FIG. 8 shows an example configuration of a data table held in the relay device 62 according to Embodiment 2 of the invention.

As shown in FIG. 8, the data table is formed of data relating to the node 71.

To be specific, the data table is formed of data relating to the nodes 71*d*, 71*e*, 71*f*, and 71*g* on the communication network 102*a* at the A port side, data relating to the nodes 71*h*, 71*i*, 71*j*, and 71*k* on the communication network 102*b* at the B port side, and data relating to the nodes 71*l*, 71*m*, 71*n*, and 71*o* on the communication network 102*c* at the C port side.

First, the data table relating to the A port side is described.

In the data table, a pair, the pair comprising communication address data and model data, is set as data relating to the node 71*d*.

The model data mentioned here is, for example, a specific component, such as an indoor unit or an outdoor unit, forming an air-conditioning system.

For example, as shown in FIG. 7, for the node 71*d* forming the logical communication relationship with the communication network 102*a* at the A port side, the address #1 is set as the communication address, and the model data is set as the outdoor unit.

Also, in the data table, a pair, the pair comprising communication address data and model data, is set as data relating to the node 71e.

The model data mentioned here is, for example, a specific component, such as an indoor unit or an outdoor unit, forming an air-conditioning system.

For example, as shown in FIG. 7, for the node 71e forming the logical communication relationship with the communication network 102a at the A port side, the address #2 is set as the communication address, and the model data is set as the indoor unit.

Also, in the data table, a pair, the pair comprising communication address data and model data, is set as data relating to the node 71f.

The model data mentioned here is, for example, a specific component, such as an indoor unit or an outdoor unit, forming an air-conditioning system.

For example, as shown in FIG. 7, for the node 71f forming the logical communication relationship with the communication network 102a at the A port side, the address #3 is set as the communication address, and the model data is set as the indoor unit.

Also, in the data table, a pair, the pair comprising communication address data and model data, is set as data relating to the node 71g.

The model data mentioned here is, for example, a specific component, such as an indoor unit or an outdoor unit, forming an air-conditioning system.

For example, as shown in FIG. 7, for the node 71g forming the logical communication relationship with the communication network 102a at the A port side, the address #4 is set as the communication address, and the model data is set as the indoor unit.

Next, the data table relating to the B port side is described.

In the data table, a pair, the pair comprising communication address data and model data, is set as data relating to the node 71h.

The model data mentioned here is, for example, a specific component, such as an indoor unit or an outdoor unit, forming an air-conditioning system.

For example, as shown in FIG. 7, for the node 71h forming the logical communication relationship with the communication network 102b at the B port side, the address #5 is set as the communication address, and the model data is set as the outdoor unit.

Also, in the data table, a pair, the pair comprising communication address data and model data, is set as data relating to the node 71i.

The model data mentioned here is, for example, a specific component, such as an indoor unit or an outdoor unit, forming an air-conditioning system.

For example, as shown in FIG. 7, for the node 71i forming the logical communication relationship with the communication network 102b at the B port side, the address #6 is set as the communication address, and the model data is set as the indoor units.

Also, in the data table, a pair, the pair comprising communication address data and model data, is set as data relating to the node 71j.

The model data mentioned here is, for example, a specific component, such as an indoor unit or an outdoor unit, forming an air-conditioning system.

For example, as shown in FIG. 7, for the node 71j forming the logical communication relationship with the communication network 102b at the B port side, the address #7 is set as the communication address, and the model data is set as the indoor unit.

Also, in the data table, a pair, the pair comprising communication address data and model data, is set as data relating to the node 71k.

The model data mentioned here is, for example, a specific component, such as an indoor unit or an outdoor unit, forming an air-conditioning system.

For example, as shown in FIG. 7, for the node 71k forming the logical communication relationship with the communication network 102b at the B port side, the address #8 is set as the communication address, and the model data is set as the remote controller.

Next, the data table relating to the C port side is described.

In the data table, a pair, the pair comprising communication address data and model data, is set as data relating to the node 71l.

The model data mentioned here is, for example, a specific component, such as an indoor unit or an outdoor unit, forming an air-conditioning system.

For example, as shown in FIG. 7, for the node 71l forming the logical communication relationship with the communication network 102c at the C port side, the address #9 is set as the communication address, and the model data is set as the outdoor unit.

Also, in the data table, a pair, the pair comprising communication address data and model data, is set as data relating to the node 71m.

The model data mentioned here is, for example, a specific component, such as an indoor unit or an outdoor unit, forming an air-conditioning system.

For example, as shown in FIG. 7, for the node 71m forming the logical communication relationship with the communication network 102c at the C port side, the address #10 is set as the communication address, and the model data is set as the outdoor unit.

Also, in the data table, a pair, the pair comprising communication address data and model data, is set as data relating to the node 71n.

The model data mentioned here is, for example, a specific component, such as an indoor unit or an outdoor unit, forming an air-conditioning system.

For example, as shown in FIG. 7, for the node 71n forming the logical communication relationship with the communication network 102c at the C port side, the address #11 is set as the communication address, and the model data is set as the indoor unit.

Also, in the data table, a pair, the pair comprising communication address data and model data, is set as data relating to the node 71o.

The model data mentioned here is, for example, a specific component, such as an indoor unit or an outdoor unit, forming an air-conditioning system.

For example, as shown in FIG. 7, for the node 71o forming the logical communication relationship with the communication network 102c at the C port side, the address #12 is set as the communication address, and the model data is set as the centralized management device.

That is, node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, and node information formed of a pair, the pair comprising a communication address being #4 and model data being the indoor unit are formed at the A port side.

Node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

Node information formed of a pair of a communication address being #9 and model data being the outdoor unit, node information formed of a pair of a communication address being #10 and model data being the outdoor unit, node information formed of a pair, the pair comprising a communication address being #11 and model data being the indoor unit, and node information formed of a pair of a communication address being #12 and model data being the centralized management device are formed at the C port side.

The form of the data table is not limited thereto.

For example, a communication address table including only communication addresses and a model data table including only model data may be previously created, and a mapping table in which the communication address table is associated with the model data table on a one-by-one basis may be created, so that a pair of a communication address and model data can be created.

Alternatively, an integrated form of the communication address table, the model data table, and the mapping table may define a data table.

Also, the data in the data table may be previously stored in the storage unit 82 before operation of the air-conditioning system 52, or may be set when the data of the data table is supplied from a certain node 71 during operation of the air-conditioning system 52.

Figure 9:
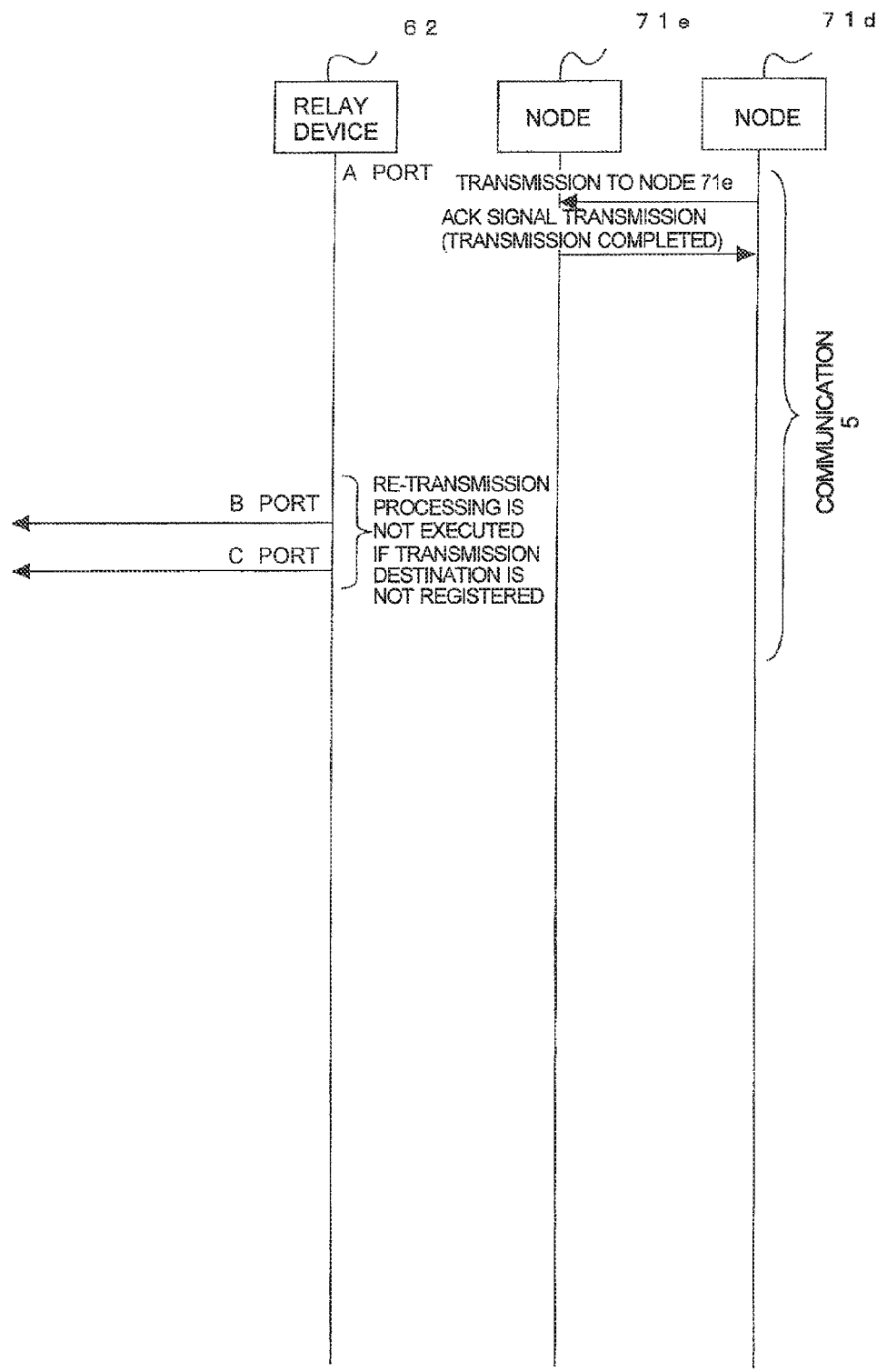
FIG. 9 is a sequence showing a series of example operations between respective nodes and the relay device 62 in the same communication network of the air-conditioning system 52 according to Embodiment 2 of the invention.

FIG. 9 is a sequence showing a series of example operations between nodes and the relay device 62 in the same communication network of the air-conditioning system 52 according to Embodiment 2 of the invention.

As shown in FIG. 9, communication 5 is data transmission from the node 71d to the node 71e.

The details of the communication 5 are successively described below.

Communication 5

Processing of the communication 5 is described.

The node 71d transmits a communication frame to the node 71e.

Then, the node 71e receives the communication frame transmitted from the node 71d, and then transmits an ACK signal to the node 71d.

The node 71d receives the ACK signal from the node 71e, and then completes transmission processing of the own node.

The relay device 62 receives the communication frame to the node 71e, the communication frame received from the node 71d, at the A port, and then transmits the communication frame from the B port and the C port not having the communication relationship with the node 71e.

Since the node 71e is not registered in the B port or the C port, the relay device 62 does not transmit ACK.

Processing at the B port side is described.

The relay device 62 transmits the communication frame to the node 71e from the B port.

The relay device 62 has not received any ACK signal from the node 71e that is the transmission destination for a predetermined period; however, the node 71e that is the transmission destination is not registered in the data table relating to the B port side. Hence, in this case, the processing of re-transmitting the same communication frame to the node 71e from the B port is not executed.

That is, if the node of the transmission destination is not registered, even though the relay device 62 has not received any ACK signal from the node 71e that is the transmission destination for the predetermined period, the relay device 62 does not execute the processing of re-transmitting the same communication frame to the node 71e from the B port.

In other words, if the transfer destination of the communication frame bounded for transfer processing is not registered, the relay device 62 sets the number of re-transmission times at zero.

Processing at the C port side is described.

The relay device 62 transmits the communication frame to the node 71e from the C port.

The relay device 62 has not received any ACK signal from the node 71e that is the transmission destination for the predetermined period; however, the node 71e that is the transmission destination is not registered in the data table relating to the C port side. Hence, in this case, the processing of re-transmitting the same communication frame to the node 71e from the C port is not executed.

That is, if the node of the transmission destination is not registered, even though the relay device 62 has not received any ACK signal from the node 71e that is the transmission destination for the predetermined period, the relay device 62 does not execute the processing of re-transmitting the same communication frame to the node 71e from the C port.

In other words, if the transfer destination of the communication frame bounded for transfer processing is not registered, the relay device 62 sets the number of re-transmission times at zero.

In this way, the processing of the communication 5 is executed.

In the above description, the processing at the B port side is described and then the processing at the C port side is described for convenience of description; however, the processing does not have to be successively executed as described above, and the processing may be executed in parallel.

Figure 10:
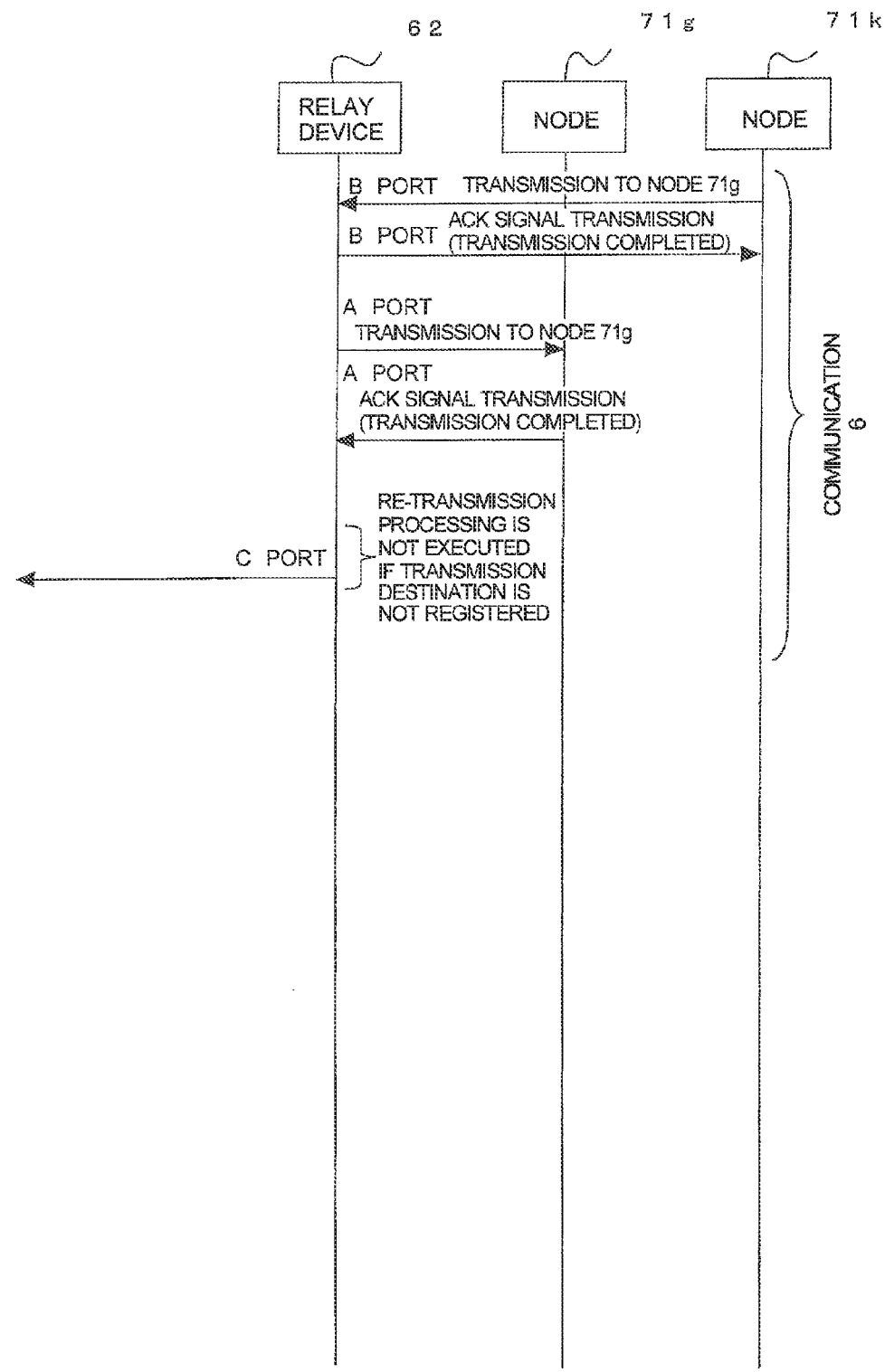
FIG. 10 is a sequence showing a series of example operations between respective nodes and the relay device 62 in different communication networks of the air-conditioning system 52 according to Embodiment 2 of the invention.

FIG. 10 is a sequence showing a series of example operations between nodes and the relay device 62 in different communication networks of the air-conditioning system 52 according to Embodiment 2 of the invention.

As shown in FIG. 10, communication 6 is data transmission from the node 71k to the node 71g.

The details of the communication 6 are successively described below.

Communication 6

Processing of the communication 6 is described.

The node 71k transmits a communication frame to the node 71g.

The relay device 62 receives the communication frame transmitted from the node 71k at the B port, and then transmits an ACK signal from the B port to the node 71k.

The node 71k receives the ACK signal from the relay device 62, and then completes transmission processing of the own node.

The relay device 62 transmits the communication frame to the node 71g, the communication frame received from the node 71k, from the A port having the connection relationship with the node 71g and the C port not having the connection relationship with the node 71g.

Processing at the A port side is described.

The relay device 62 transfers the communication frame from the A port to the node 71g.

The node 71g receives the communication frame bounded for the own node transferred from the relay device 62.

The node 71g transmits an ACK signal to the relay device.

The relay device 62 receives the ACK signal from the node 71g, and then completes transmission processing of transferring the communication frame to the node 71g. In this case, the relay device 62 transmits the communication frame from the B port side and the C port side.

Processing at the C port side is described.

The relay device 62 transmits the communication frame to the node 71g from the C port.

The relay device 62 has not received any ACK signal from the node 71g that is the transmission destination for a predetermined period; however, the node 71g that is the transmission destination is not registered in the data table relating to the C port side. Hence, in this case, the processing of re-transmitting the same communication frame to the node 71g from the C port is not executed.

That is, if the node of the transmission destination is not registered, even though the relay device 62 has not received any ACK signal from the node 71g that is the transmission destination for the predetermined period, the relay device 62 does not execute the processing of re-transmitting the same communication frame to the node 71g from the C port.

In other words, if the transfer destination of the communication frame bounded for transfer processing is not registered, the relay device 62 sets the number of re-transmission times at zero.

In this way, the processing of the communication 6 is executed.

In the above description, the processing at the A port side is described and then the processing at the C port side is described for convenience of description; however, the processing does not have to be successively executed as described above, and the processing may be executed in parallel.

Figure 11:
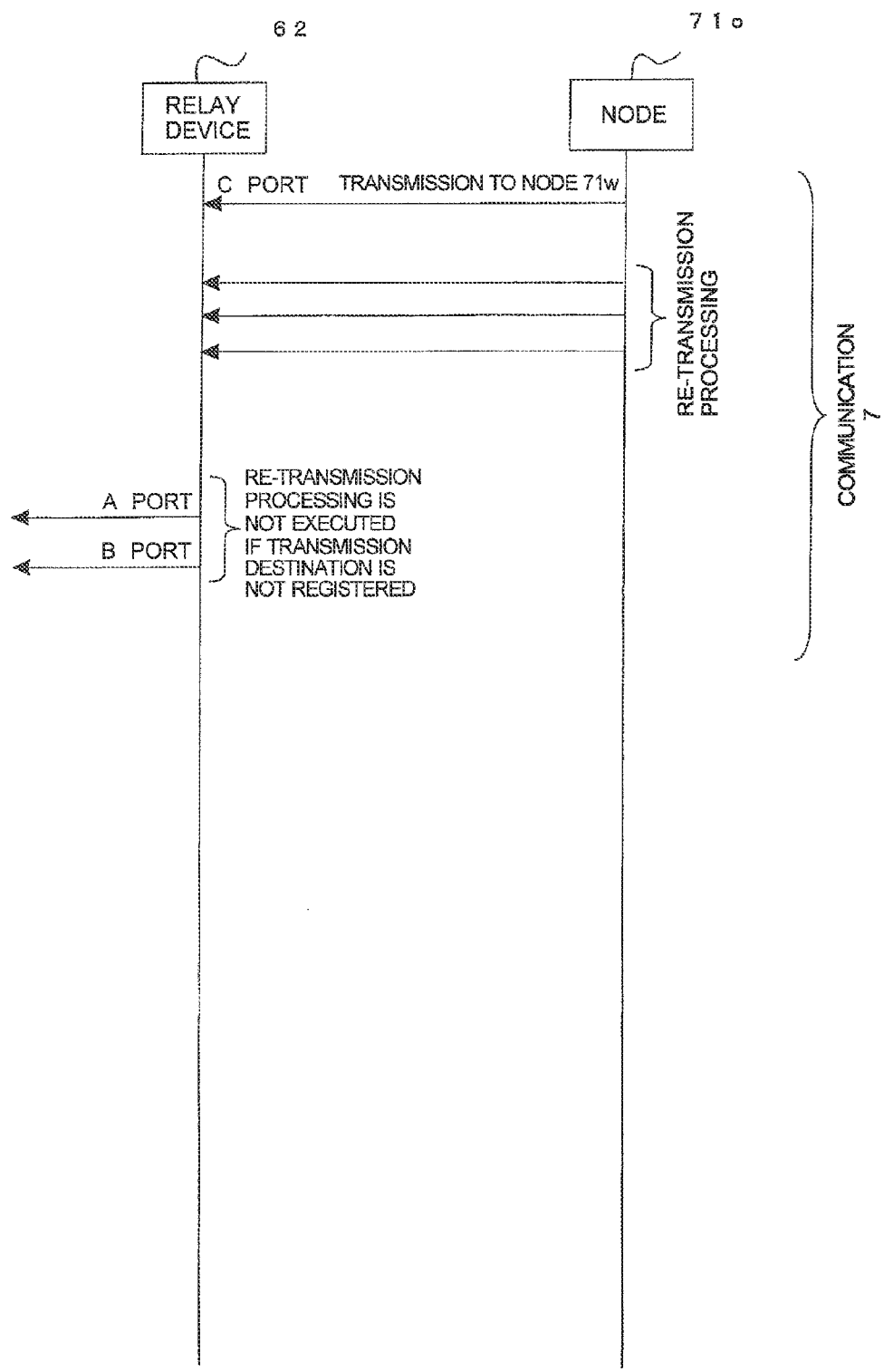
FIG. 11 is a sequence showing an example of data transmission to a node not present in the air-conditioning system 52 according to Embodiment 2 of the invention.

FIG. 11 is a sequence showing an example of data transmission to a node not present in the air-conditioning system 52 according to Embodiment 2 of the invention.

As shown in FIG. 11, communication 7 is data transmission from the node 71o to the node 71w.

The details of the communication 7 are successively described below.

Communication 7

Processing of the communication 7 is described.

The node 71o transmits a communication frame to the node 71w.

Although the relay device 62 receives the communication frame transmitted from the node 71o at the C port, since the node 71w is not registered in the A port or the B port, the relay device 62 does not transmit ACK.

Since the node 71o has not received any ACK signal from the node 71w that is the transmission destination for a predetermined period, the node 71o re-transfers the same communication frame to the node 71w a predetermined number of times.

The relay device 62 receives the re-transmitted frame; however, the relay device 62 judges that the received frame is the re-transmitted frame with regard to the contents of the received frame, and the relay device 62 does not transfer the re-transmitted frame.

The relay device 62 transmits the communication frame to the node 71w, the communication frame received from the node 71o, from the A port and the B port not having the communication relationship with the node 71w.

Processing at the A port side is described.

The relay device 62 transmits the communication frame to the node 71w from the A port.

The relay device 62 has not received any ACK signal from the node 71w that is the transmission destination for a predetermined period; however, the node 71w that is the transmission destination is not registered in the data table relating to the A port side. Hence, in this case, the processing of re-transmitting the same communication frame to the node 71w from the A port is not executed.

That is, if the node of the transmission destination is not registered, even though the relay device 62 has not received any ACK signal from the node 71w that is the transmission destination for the predetermined period, the relay device 62 does not execute the processing of re-transmitting the same communication frame to the node 71w from the A port.

In other words, if the transfer destination of the communication frame bounded for transfer processing is not registered, the relay device 62 sets the number of re-transmission times at zero.

Processing at the B port side is described.

The relay device 62 transmits the communication frame to the node 71w from the B port.

The relay device 62 has not received any ACK signal from the node 71w that is the transmission destination for the predetermined period; however, the node 71w that is the transmission destination is not registered in the data table relating to the B port side. Hence, in this case, the processing of re-transmitting the same communication frame to the node 71w from the B port is not executed.

That is, if the node of the transmission destination is not registered, even though the relay device 62 has not received any ACK signal from the node 71w that is the transmission destination for the predetermined period, the relay device 62 does not execute the processing of re-transmitting the same communication frame to the node 71w from the B port.

In other words, if the transfer destination of the communication frame bounded for transfer processing is not registered, the relay device 62 sets the number of re-transmission times at zero.

In this way, the processing of the communication 7 is executed.

In the above description, the processing at the A port side is described and then the processing at the B port side is described for convenience of description; however, the processing does not have to be successively executed as described above, and the processing may be executed in parallel.

In this way, if the re-transmission processing has a limitation, the re-transmission processing is not uniformly repeatedly executed in the processing of the communication 5 to the communication 7.

Hence, the communication traffic on the network of the air-conditioning system 52 is not increased more than necessary.

That is, the communication traffic of the communication network 102 in the air-conditioning system 52 can be decreased.

Further, as described above, the transmission frame is transferred at least once regardless of the contents of the data table relating to each port side.

That is, the relay device 62 outputs the communication frame from each communication port to each node of the communication network 102 having the connection relationship with this communication port.

Hence, the communication contents of the entire air-conditioning system 52 can be monitored at any position on the communication network 102 of the air-conditioning system 52.

As described above, in Embodiment 2, the centralized management device that manages the plurality of communication networks is further set as one of the plurality of nodes. The relay device 62 sets the centralized management device as the model data. Accordingly, the communication contents of the entire air-conditioning system 52 can be monitored.

Embodiment 3

Embodiment 3 differs from Embodiments 1 and 2 in that one node of a plurality of nodes on a communication network is removed.

In Embodiment 3, matters which are not particularly written are assumed to be similar to those in Embodiments 1 and 2, and the same functions and configurations are described by using the same reference signs.

Description for the same functions and configurations, as those in Embodiments 1 and 2 is omitted.

Figure 12:
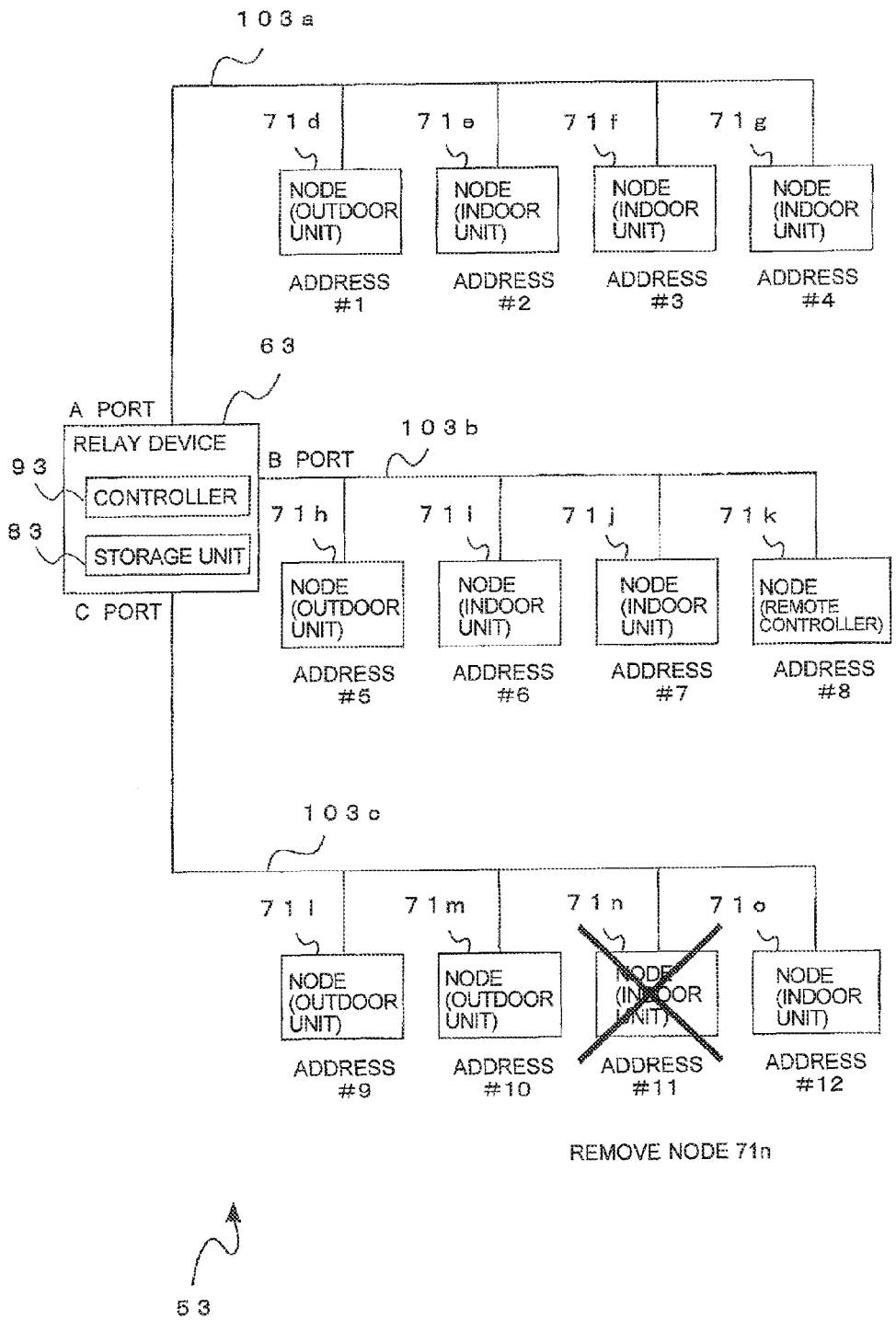
FIG. 12 shows an example configuration of an air-conditioning system 53 according to Embodiment 3 of the invention.

FIG. 12 shows an example configuration of an air-conditioning system 53 according to Embodiment 3 of the invention.

As shown in FIG. 12, the air-conditioning system 53 conditions the indoor air such that a relay device 63, nodes 71*d*, 71*e*, 71*f*, 71*g*, 71*h*, 71*i*, 71*j*, 71*k*, 71*l*, 71*m*, 71*n*, and 71*o*, and other components are associated with each other. At this time, communication is mutually made for various data.

Since respective components of the air-conditioning system 53 are similar to the components of the air-conditioning system 52 in Embodiment 2, the description thereof is omitted.

Communication networks 103*a*, 103*b*, and 103*c* are collectively called communication network 103 unless one of the communication networks 103*a*, 103*b*, and 103*c* is particularly distinguished from the others.

The relay device 63 includes a storage unit 83 and a controller 93.

FIG. 13 shows a transition of registered contents of a data table held in the relay device 63 according to Embodiment 3 of the invention.

A data table 201 for node information before deregistration is formed of node information relating to an A port side, node information relating to a B port side, and node information relating to a C port side.

The details of the data table 201 for the node information before deregistration is described in the order of the A port side, the B port side, and the C port side.

Node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, and node information formed of a pair, the pair comprising a communication address being #4 and model data being the indoor unit, are formed at the A port side.

Node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

Node information formed of a pair of a communication address being #9 and model data being the outdoor unit, node information formed of a pair of a communication address being #10 and model data being the outdoor unit, node information formed of a pair, the pair comprising a communication address being #11 and model data being the indoor unit, and node information formed of a pair, the pair comprising a communication address being #12 and model data being the indoor unit, are formed at the C port side.

A data table 202 for node information after deregistration is formed of node information relating to the A port side, node information relating to the B port side, and node information relating to the C port side.

The details of the data table 202 for the node information after deregistration is described in the order of the A port side, the B port side, and the C port side.

Node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, and node information formed of a pair, the pair comprising a communication address being #4 and model data being the indoor unit, are formed at the A port side.

Node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

Node information formed of a pair of a communication address being #9 and model data being the outdoor unit, node information formed of a pair of a communication address being #10 and model data being the outdoor unit, empty node information after node information formed of a pair, the pair comprising a communication address being #11 and model data being the indoor unit, is deleted, and node information formed of a pair, the pair comprising a communication address being #12 and model data being the indoor unit, are formed at the C port side.

That is, the node information with the communication address being #11 is deregistered.

To be specific, the node 71*n* shown in FIG. 12 is removed.

Processing of updating the registered contents of the data table in this way is described with reference to FIG. 14.

Figure 14:
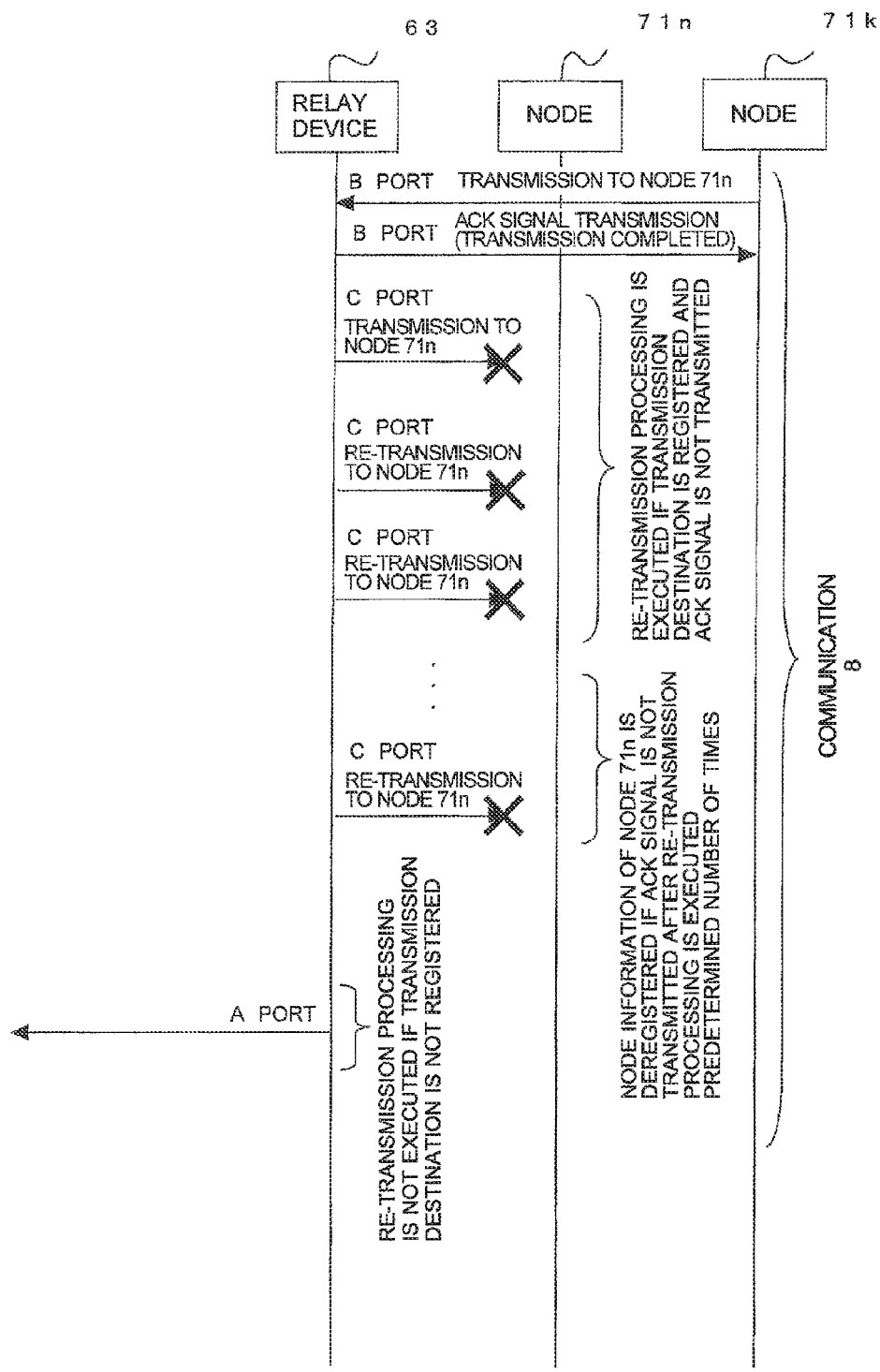
FIG. 14 is a sequence showing a series of example operations between respective nodes and the relay device 63 of the air-conditioning system 53 according to Embodiment 3 of the invention.

FIG. 14 is a sequence showing a series of example operations between respective nodes and the relay device 63 of the air-conditioning system 53 according to Embodiment 3 of the invention.

As shown in FIG. 14, communication 8 is data transmission from the node 71*k* to the node 71*n*.

The details of the communication 8 are successively described below.

Communication 8

The node 71*k* transmits a communication frame to the node 71*n*.

The relay device 63 receives the communication frame transmitted from the node 71k at the B port, and then transmits an ACK signal from the B port to the node 71k.

The node 71k receives the ACK signal from the relay device 63, and then completes transmission processing of the own node.

The relay device 63 transmits the communication frame to the node 71n, the communication frame received from the node 71k, from the C port having the connection relationship with the node 71n and the A port not having the connection relationship with the node 71n.

Processing at the C port side is described.

The relay device 63 transfers the communication frame from the C port to the node 71n.

The relay device 63 does not receive an ACK signal from the node 71n that is the transmission destination for a predetermined period. However, the node 71n that is the transmission destination is registered in the data table relating to the C port side. Hence, in this case, the processing of re-transmitting the same communication frame to the node 71n from the C port is executed.

That is, if the node of the transmission destination is registered, even though the relay device 63 has not received any ACK signal from the node 71n that is the transmission destination for the predetermined period, the relay device 63 executes the processing of re-transmitting the same communication frame to the node 71n from the C port.

In other words, the relay device 63 sets the number of re-transmission times at a preset threshold number of times if the transfer destination of the communication frame is registered. The threshold number of times may be smaller than the number of normal transmission times. Such a threshold number of times is, for example, two times; however, it is not limited thereto.

Since the relay device 63 has not received any ACK signal from the node 71n that is the transmission destination after the re-transmission processing for the predetermined period, the relay device 63 re-transfers the same communication frame to the node 71n from the C port.

Although the relay device 63 repeats the re-transmission processing a predetermined number of times, the ACK signal is not transmitted from the node 71n. That is, the relay device 63 has not received any ACK signal from the node 71n although the relay device 63 repeats the re-transmission processing a predetermined number of times.

The re-transmission processing of the predetermined number of times is, for example, four times; however, it is not limited thereto.

If the relay device 63 has not received any ACK signal in this way although the relay device 63 executes the re-transmission processing a plurality of times, the relay device 63 deregisters the node information of the node 71n.

That is, after the re-transmission processing by the predetermined number of times, if the ACK signal is not transmitted, the node information of the node 71n is deregistered.

Processing at the A port side is described.

The relay device 63 transmits the communication frame to the node 71n from the A port.

The relay device 63 has not received any ACK signal from the node 71n that is the transmission destination for the predetermined period; however, the node 71n that is the transmission destination is not registered in the data table relating to the A port side. Hence, in this case, the processing of re-transmitting the same communication frame to the node 71n from the A port is not executed.

That is, if the node of the transmission destination is not registered, even though the relay device 63 has not received any ACK signal from the node 71n that is the transmission destination for the predetermined period, the relay device 63 does not execute the processing of re-transmitting the same communication frame to the node 71n from the A port.

In this way, the processing of the communication 8 is executed.

In the above description, the processing at the C port side is described and then the processing at the A port side is described for convenience of description; however, the processing does not have to be successively executed as described above, and the processing may be executed in parallel.

In this way, in the relay device 63, if the communication address of the transfer-destination node of the communication frame is registered and if the ACK signal is not received from the transfer-destination node after the communication frame is transferred, the node information corresponding to the transfer destination is deleted from the data table.

In other words, if the transmission destination is registered and the ACK signal is not transmitted, the re-transmission processing is repeatedly executed the predetermined number of times. However, even if the ACK signal is not transmitted, the node information being the transmission destination is deregistered.

Accordingly, the communication frame is not re-transmitted to the node 71n, which is removed from the communication network 103, more than necessary.

Hence, the communication traffic of the communication network 103 is not increased more than necessary.

Consequently, the communication traffic of the communication network 103 can be decreased.

Also, if ACK is not transmitted even after the re-transmission processing is executed the predetermined number of times, the subject node information is deregistered, or in other words, deleted. Hence, the data table can be actively updated.

As described above, by actively updating the node information, the relay device 63 can deregister the node information.

As described above, according to Embodiment 3, if the communication address of a transfer-destination node of the communication frame is not registered and if the relay device 63 receives a reception acknowledgment signal from the transfer-destination node after the transfer of the communication frame, the relay device 63 adds a communication address of the node of a transmission source and model data of the node set in the reception acknowledgment signal, as the node information to the data table, and if the communication address of the transfer-destination node of the communication frame is registered and if the relay device 63 does not receive the reception acknowledgment signal from the transfer-destination node after the transfer of the communication frame, the relay device 63 deletes the node information corresponding to the transfer destination from the data table.

Embodiment 4

Embodiment 4 differs from Embodiments 1 to 3 in that a node is added to a communication network.

In Embodiment 4, matters which are not particularly written are assumed to be similar to those in Embodiments 1 to 3, and the same functions and configurations are described by using the same reference signs.

Description for the same functions and configurations, as those in Embodiments 1 to 3 is omitted.

Figure 15:
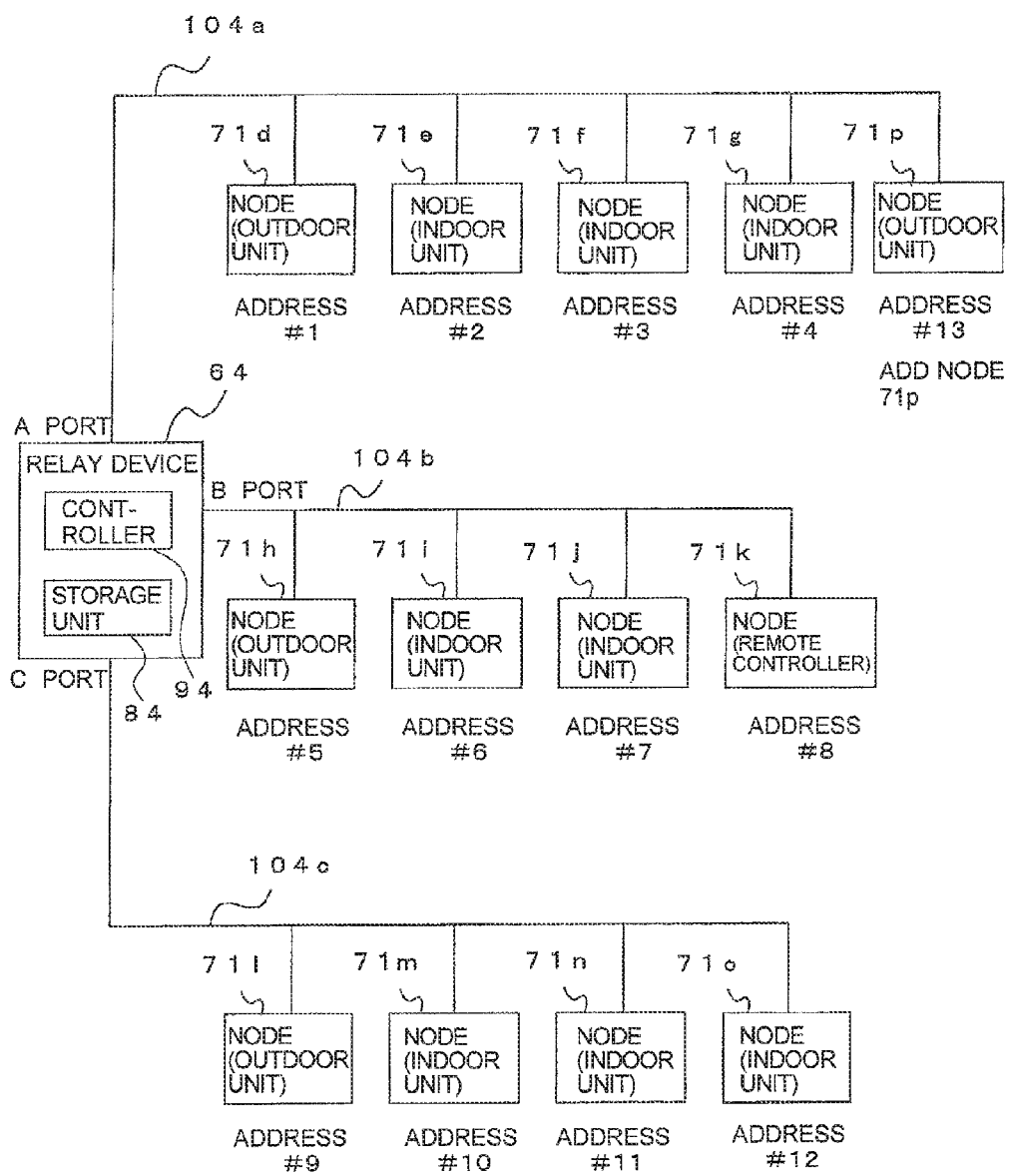
FIG. 15 shows an example configuration of an air-conditioning system 54 according to Embodiment 4 of the invention.

FIG. 15 shows an example configuration of an air-conditioning system 54 according to Embodiment 4 of the invention.

As shown in FIG. 15, the air-conditioning system 54 conditions the indoor air such that a relay device 64, nodes 71d, 71e, 71f, 71g, 71h, 71i, 71j, 71k, 71l, 71m, 71n, 71o, and 71p, and other components are associated with each other. At this time, communication is mutually made for various data.

Since respective components of the air-conditioning system 54 are similar to the components of the air-conditioning system 52 in Embodiment 2 except the added node, the description thereof is omitted.

The node to be added in this case has a communication address being #13 and model data being an outdoor unit as described later with reference to FIG. 16. However, it is not limited thereto.

Also, communication networks 104a, 104b, and 104c are collectively called communication network 104 unless one of the communication networks 104a, 104b, and 104c is particularly distinguished from the others.

The relay device 64 includes a storage unit 84 and a controller 94.

FIG. 16 shows a transition of registered contents of a data table held in the relay device 64 according to Embodiment 4 of the invention.

A data table 203 for node information before additional node registration is formed of node information relating to the A port side, node information relating to the B port side, and node information relating to the C port side.

The details of the data table 203 for the node information before additional node registration is described in the order of the A port side, the B port side, and the C port side.

Node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, and node information formed of a pair, the pair comprising a communication address being #4 and model data being the indoor unit, are formed at the A port side.

Node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

Node information formed of a pair of a communication address being #9 and model data being the outdoor unit, node information formed of a pair of a communication address being #10 and model data being the outdoor unit, node information formed of a pair, the pair comprising a communication address being #11 and model data being the indoor unit, and node information formed of a pair, the pair comprising a communication address being #12 and model data being the indoor unit, are formed at the C port side.

A data table 204 for node information after additional node registration is formed of node information relating to the A port side, node information relating to the B port side, and node information relating to the C port side.

The details of the data table 204 for the node information after additional node registration is described in the order of the A port side, the B port side, and the C port side.

Node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, node information formed of a pair, the pair comprising a communication address being #4 and model data being the indoor unit, and node information formed of a pair of a communication address being #13 and model data being the outdoor unit are formed at the A port side.

Node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

Node information formed of a pair of a communication address being #9 and model data being the outdoor unit, node information formed of a pair of a communication address being #10 and model data being the outdoor unit, node information formed of a pair, the pair comprising a communication address being #11 and model data being the indoor unit, and node information formed of a pair, the pair comprising a communication address being #12 and model data being the indoor unit, are formed at the C port side.

That is, in the data table relating to the A port side, the node information with the communication address being #13 is additionally registered.

To be specific, the node 71p shown in FIG. 15 is added.

Processing of updating the registered contents of the data table in this way is described with reference to FIG. 17.

Figure 17:
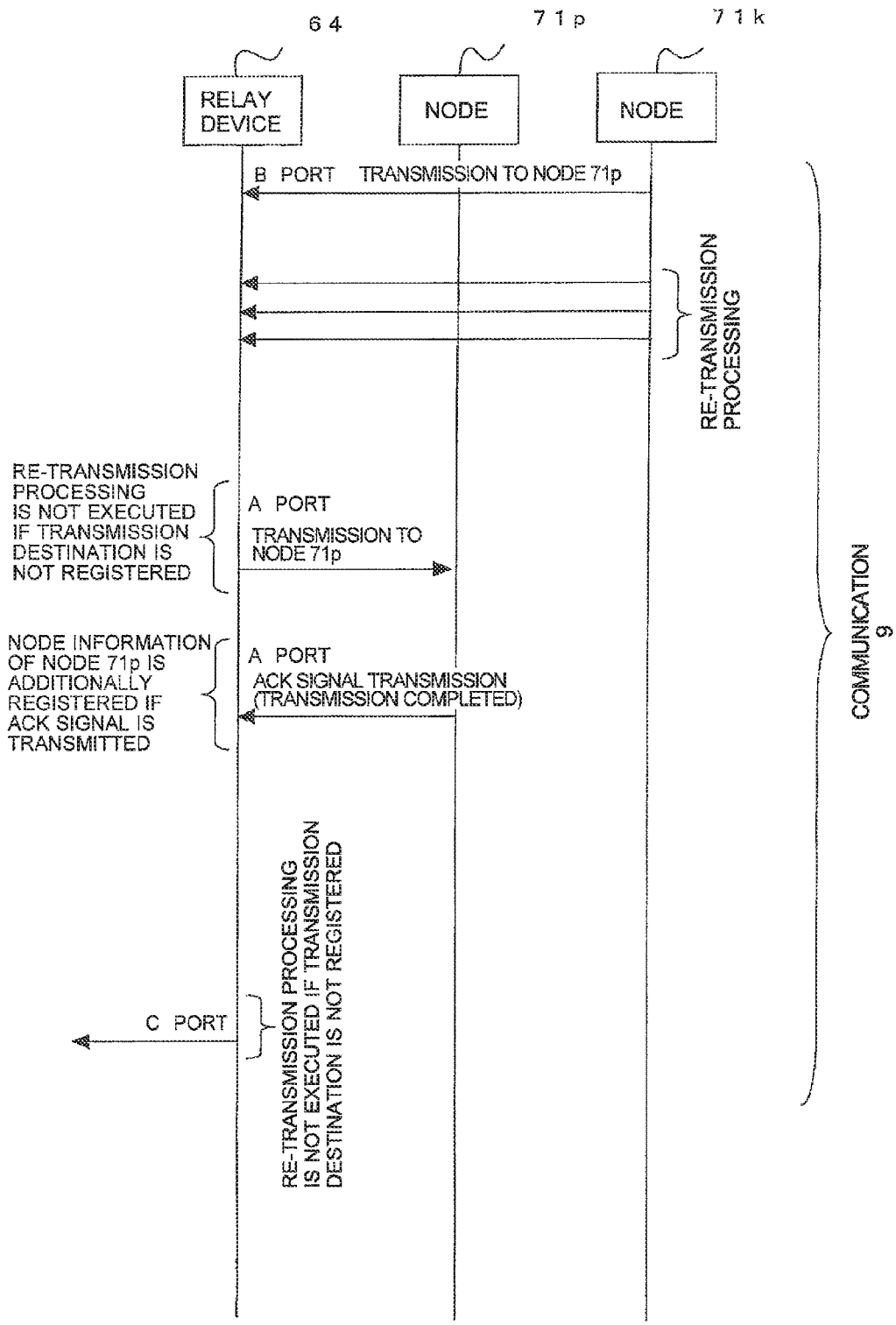
FIG. 17 is a sequence showing a series of example operations between respective nodes and the relay device 64 of the air-conditioning system 54 according to Embodiment 4 of the invention.

FIG. 17 is a sequence showing a series of example operations between respective nodes and the relay device 64 of the air-conditioning system 54 according to Embodiment 4 of the invention.

As shown in FIG. 17, communication 9 is data transmission from the node 71k to the node 71p.

The details of the communication 9 are successively described below.

Communication 9

The node 71k transmits a communication frame to the node 71p.

Although the relay device 64 receives the communication frame transmitted from the node 71k at the B port, since the node 71p is not registered in the A port or the C port, the relay device 64 does not transmit ACK.

Since the node 71k has not received any ACK signal from the node 71p that is the transmission destination for a predetermined period, the node 71k re-transfers the same communication frame to the node 71p a predetermined number of times.

The relay device 64 receives the re-transmitted frame; however, the relay device 64 judges that the received frame is the re-transmitted frame with regard to the contents of the received frame, and the relay device 64 does not transfer the re-transmitted frame.

The relay device 64 transmits the communication frame to the node 71p, the communication frame received from the node 71*k*, from the A port and the C port not having the communication relationship with the node 71*p*.

Processing at the A port side is described.

The relay device 64 transmits the communication frame to the node 71*p* from the A port.

The node 71*p* receives the communication frame bounded for the own node from the relay device 64, and then transmits an ACK signal to the relay device 64.

The relay device 64 receives the ACK signal from the node 71*p*, and then completes transmission processing. However, the relay device 64 executes processing at the B port side and processing at the C port side.

At this time, since the relay device 64 receives the ACK signal from the node 71*p* that is the transmission destination, the relay device 64 additionally registers the node information of the node 71*p* which is the transmission source of the ACK signal.

For example, the relay device 64 extracts information indicative of the communication address #13 and the model data being the outdoor unit of the transmission source included in the ACK signal, and additionally registers the extracted information indicative of the communication address #13 and the model data being the outdoor unit to the data table.

That is, if the ACK signal is present although re-transmission processing is not executed although the transmission destination is not registered, the node information of the node 71*p* is additionally registered.

Processing at the C port side is described.

The relay device 64 transmits the communication frame to the node 71*p* from the B port.

The relay device 64 has not received any ACK signal from the node 71*p* that is the transmission destination for a predetermined period; however, the node 71*p* that is the transmission destination is not registered in the data table relating to the C port side. Hence, in this case, the processing of re-transmitting the same communication frame to the node 71*p* from the C port is not executed.

That is, if the node of the transmission destination is not registered, even though the relay device 64 has not received any ACK signal from the node 71*p* that is the transmission destination for the predetermined period, the relay device 64 does not execute the processing of re-transmitting the same communication frame to the node 71*p* from the C port.

In this way, the processing of the communication 9 is executed.

In the above description, the processing at the A port side is described and then the processing at the C port side is described for convenience of description; however, the processing does not have to be successively executed as described above, and the processing may be executed in parallel.

In this way, in the relay device 64, if the communication address of the transfer-destination node of the communication frame is not registered and if the ACK signal is received from the transfer-destination node after the communication frame is transferred, the node information corresponding to the transfer destination is added to the data table.

In other words, if the transmission destination is not registered and the ACK signal is received from the node of the transfer target after the transfer of the communication frame, the relay device 64 adds the communication address and the model data of the node of the transmission source set in the ACK signal to the data table as the node information.

Accordingly, the node information of the node 71*p* added to the communication network 104 can be actively updated.

Consequently, by actively updating the node information, the relay device 64 can additionally register the node information.

As described above, according to Embodiment 4, if the communication address of a transfer-destination node of the communication frame is not registered and if the relay device 64 receives a reception acknowledgment signal from the transfer-destination node after the transfer of the communication frame, the relay device 64 adds a communication address of the node of a transmission source and model data of the node set in the reception acknowledgment signal, as the node information to the data table, and if the communication address of the transfer-destination node of the communication frame is registered and if the relay device 64 does not receive the reception acknowledgment signal from the transfer-destination node after the transfer of the communication frame, the relay device 64 additionally registers the node information by deleting the node information corresponding to the transfer destination from the data table.

Embodiment 5

Embodiment 5 differs from Embodiments 1 to 4 in that a plurality of relay devices are connected by cascade connection.

In Embodiment 5, matters which are not particularly written are assumed to be similar to those in Embodiments 1 to 4, and the same functions and configurations are described by using the same reference signs.

Description for the same functions and configurations, as those in Embodiments 1 to 4 is omitted.

Figure 18:
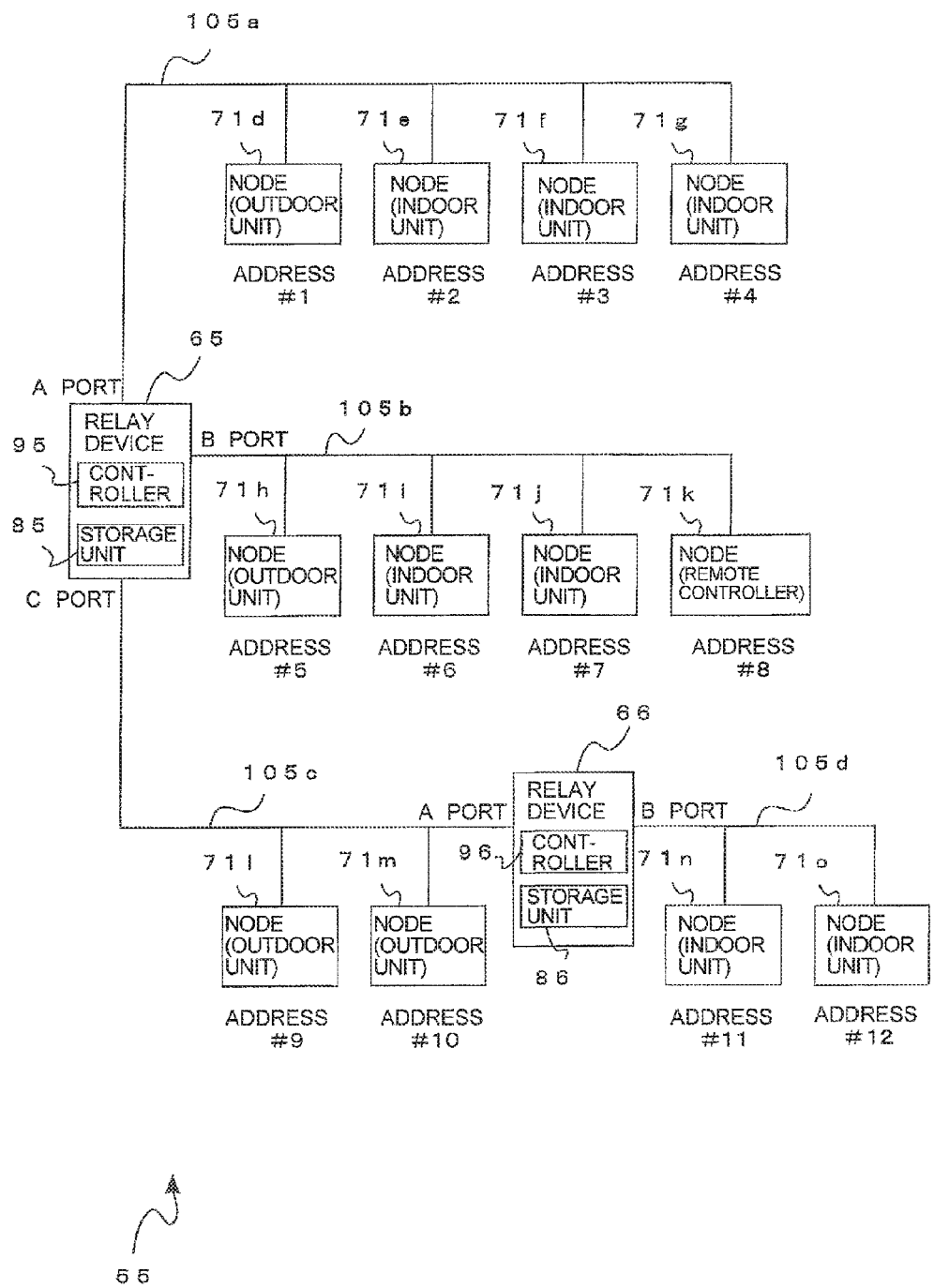
FIG. 18 shows an example configuration of an air-conditioning system 55 according to Embodiment 5 of the invention.

FIG. 18 shows an example configuration of an air-conditioning system 55 according to Embodiment 5 of the invention.

As shown in FIG. 18, the air-conditioning system 55 conditions the indoor air such that relay devices 65 and 66, nodes 71*d*, 71*e*, 71*f*, 71*g*, 71*h*, 71*i*, 71*j*, 71*k*, 71*l*, 71*m*, 71*n*, and 71*o*, and other components are associated with each other. At this time, communication is mutually made for various data.

The relay device 65 includes a storage unit 85 and a controller 95.

Since functional configurations of the relay devices 65 and 66 are similar to those of the relay devices 61 to 64 described in Embodiments 1 to 4, the description thereof is omitted.

Also, since a communication network 105*d* is also similar to the communication networks 101 to 104 described in Embodiments 1 to 4, the description thereof is omitted.

Communication networks 105*a*, 105*b*, 105*c*, and 105*d* are collectively called communication network 105 unless one of the communication networks 105*a*, 105*b*, 105*c*, and 105*d* is particularly distinguished from the others.

FIG. 19 shows an example configuration of a data table held in the relay device 65 according to Embodiment 5 of the invention.

As shown in FIG. 19, node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, and node information formed of a pair, the pair comprising a communication address being #4 and model data being the indoor unit, are formed at the A port side.

As shown in FIG. 19, node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, and node information formed of a pair of a communication address being #8 and model data being the remote controller are formed at the B port side.

As shown in FIG. 19, node information formed of a pair of a communication address being #9 and model data being the outdoor unit, node information formed of a pair of a communication address being #10 and model data being the outdoor unit, node information formed of a pair, the pair comprising a communication address being #11 and model data being the indoor unit, and node information formed of a pair, the pair comprising a communication address being #12 and model data being the indoor unit, are formed at the C port side.

FIG. 20 shows an example configuration of a data table held in the relay device 66 according to Embodiment 5 of the invention.

As shown in FIG. 20, node information formed of a pair of a communication address being #1 and model data being the outdoor unit, node information formed of a pair, the pair comprising a communication address being #2 and model data being the indoor unit, node information formed of a pair, the pair comprising a communication address being #3 and model data being the indoor unit, node information formed of a pair, the pair comprising a communication address being #4 and model data being the indoor unit, node information formed of a pair of a communication address being #5 and model data being the outdoor unit, node information formed of a pair, the pair comprising a communication address being #6 and model data being the indoor unit, node information formed of a pair, the pair comprising a communication address being #7 and model data being the indoor unit, node information formed of a pair of a communication address being #8 and model data being the remote controller, node information formed of a pair of a communication address being #9 and model data being the outdoor unit, and node information formed of a pair of a communication address being #10 and model data being the outdoor unit are formed at the A port side.

As shown in FIG. 20, node information formed of a pair, the pair comprising a communication address being #11 and model data being the indoor unit, and node information formed of a pair, the pair comprising a communication address being #12 and model data being the indoor unit, are formed at the B port side.

Figure 21:
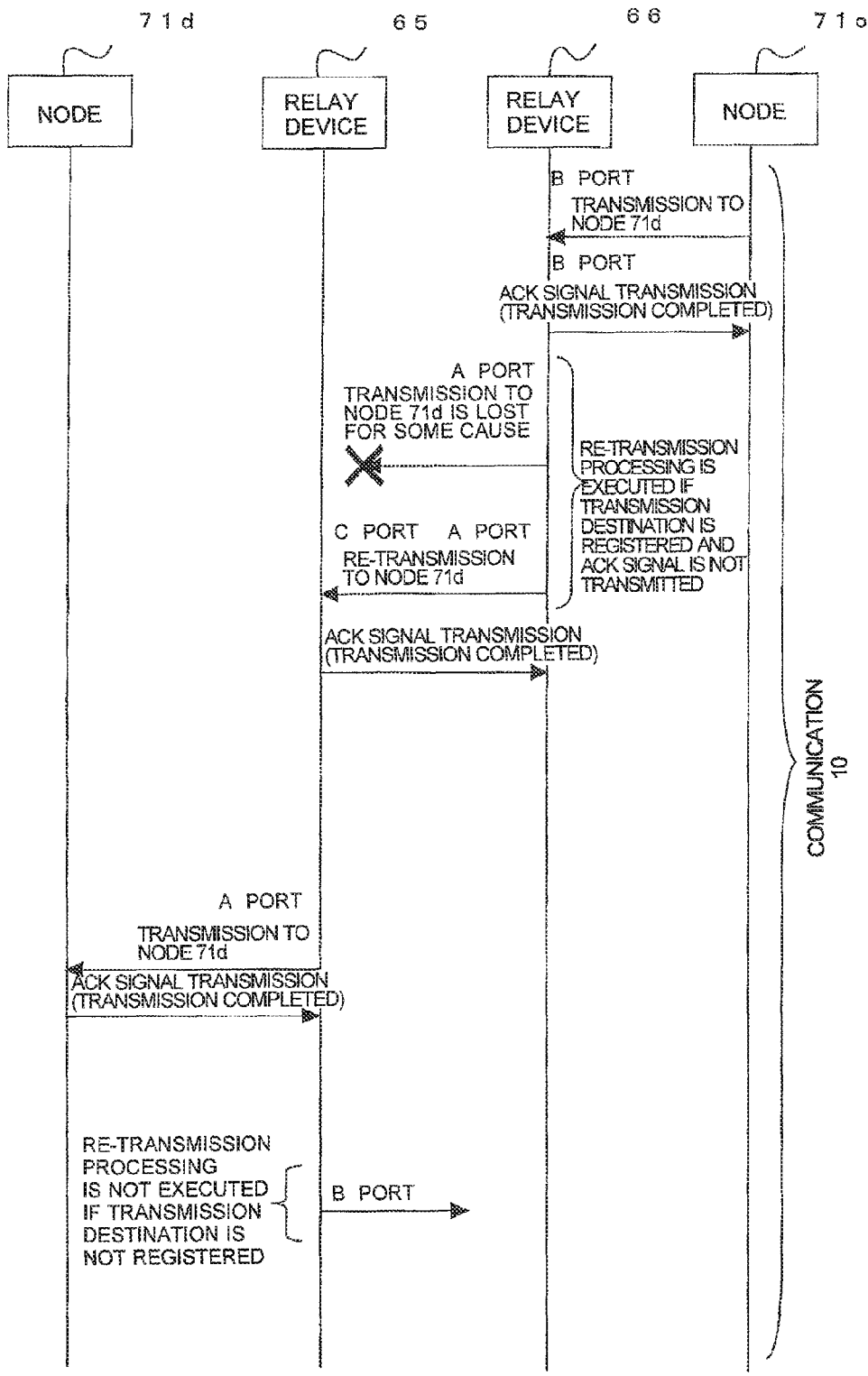
FIG. 21 is a sequence showing a series of example operations among respective nodes, the relay device 65, and the relay device 66 of the air-conditioning system 55 according to Embodiment 5 of the invention.

FIG. 21 is a sequence showing a series of example operations among respective nodes, the relay device 65, and the relay device 66 of the air-conditioning system 55 according to Embodiment 5 of the invention.

As shown in FIG. 21, communication 10 is data transmission from the node 71o to the node 71d.

The details of the communication 10 are successively described below.

Communication 10

The node 71o transmits a communication frame to the node 71d.

The relay device 66 receives the communication frame transmitted from the node 71o at the B port, and then transmits an ACK signal from the B port to the node 71o.

The node 71o receives the ACK signal from the relay device 66, and then completes transmission processing of the own node.

The relay device 66 transmits the communication frame to the node 71d, the communication frame received from the node 71o from the A port having the communication relationship with the node 71d.

Processing at the A port side of the relay device 66 is described.

The relay device 66 transmits the communication frame to the node 71d from the A port.

In this case, it is expected that the communication frame to the node 71d transmitted from the A port is lost for certain cause.

The relay device 66 does not receive an ACK signal for a predetermined period; however, the relay device 66 executes processing of re-transmitting the communication frame to the node 71d.

That is, if the transmission destination is registered and if the ACK signal is not transmitted, re-transmission processing is executed.

The relay device 65 receives the communication frame to the node 71d from the relay device 66, and then transmits the ACK signal to the relay device 66.

The relay device 66 receives the ACK signal from the relay device 65, and then completes transmission processing.

The relay device 65 transmits the communication frame to the node 71d received from the relay device 66 from the A port having the connection relationship with the node 71d and the B port not having the connection relationship with the node 71d.

Processing at the A port side of the relay device 65 is described.

The relay device 65 transfers the communication frame to the node 71d from the A port.

The node 71d receives the communication frame bounded for the own node transferred from the relay device 65.

The node 71d transmits an ACK signal to the relay device 65.

The relay device 65 receives the ACK signal from the node 71d, and then completes transmission processing of transferring the communication frame to the node 71d.

Processing at the B port side of the relay device 65 is described.

The relay device 65 transmits the communication frame to the node 71d from the B port.

The relay device 65 has not received any ACK signal from the node 71d that is the transmission destination for a predetermined period; however, the node 71d that is the transmission destination is not registered in the data table relating to the B port side. Hence, in this case, the processing of re-transmitting the same communication frame to the node 71d from the B port is not executed.

That is, if the node of the transmission destination is not registered, even though the relay device 65 has not received any ACK signal from the node 71d that is the transmission destination for the predetermined period, the relay device 65 does not execute the processing of re-transmitting the same communication frame to the node 71d from the B port.

In other words, if the transfer destination of the communication frame bounded for transfer processing is not registered, the relay device 65 sets the number of re-transmission times at zero.

In this way, the communication 10 is executed.

In the above description, the processing at the A port side is described and then the processing at the B port side is described for convenience of description; however, the processing does not have to be executed as described above, and the processing may be executed in parallel.

As described above, the relay devices 65 and 66 are connected by cascade connection, and the relay devices 65 and 66 have the respective data tables to which the node information relating to the node added by the cascade connection is added. Hence, the communication frame transmitted from the node 71o on the communication network 105d having the connection relationship with the relay device 66 is transferred to the node 71d on the communication network 105a having the connection relationship with the relay device 65, through the relay device 65.

As described above, in Embodiment 5, a plurality of relay devices are included. The relay devices 65 and 66 are connected by the cascade connection through the communication network 105c, and the relay devices 65 and 66 connected by the cascade connection have the respective data tables to which the node information relating to the node added by the cascade connection is added. Accordingly, even in the air-conditioning system in which the plurality of relay devices are connected by the cascade connection, the communication frame can be transferred.

The invention claimed is:

1. An air-conditioning system, in which at least one outdoor unit and at least one indoor unit are connected by a refrigerant pipe and operated, and the outdoor unit and the indoor unit make communication through a relay device, the air-conditioning system comprising:
the relay device including a plurality of communication ports;
a plurality of communication networks having logical connection relationships with the respective communication ports; and
a plurality of nodes having logical connection relationships with the respective communication networks,
wherein the plurality of nodes are each associated with one of the outdoor unit and the indoor unit,
wherein among the plurality of nodes,
a certain node is set as a first node, and
another certain node different from the first node is set as a second node,
wherein the relay device
executes transfer processing of transferring a communication frame from the first node to the second node, and then,
if the relay device does not receive a reception acknowledgment signal from the second node, limits a number of re-transmission times for which the relay device re-transfers the communication frame to the second node, and
wherein the relay device
sets the number of re-transmission times at zero if a transfer destination of the communication frame is not registered,
sets the number of re-transmission times at a different value in association with a preset number of normal re-transmission times, depending on a crowded degree of communication traffic, if the transfer destination of the communication frame is registered, and
outputs the communication frame from the communication ports to the plurality of nodes of the communication networks having the logical connection relationships with the communication ports.

2. The air-conditioning system of claim 1,
wherein the relay device
sets node information for each of the plurality of nodes having the connection relationships with the communication networks,
sets a communication address for the node in the node information,
sets a data table, in which a plurality of pieces of the node information are formed on a communication port basis, and
transfers the communication frame based on the data table.

3. The air-conditioning system of claim 1,
wherein the relay device
sets node information for each of the plurality of nodes having the connection relationships with the communication networks,
sets at least a pair, the pair comprising a communication address for the node and model data of either of the outdoor unit and the indoor unit corresponding to the node in the node information,
sets a data table, in which a plurality of pieces of the node information are formed on a communication port basis, and
transfers the communication frame based on the data table.

4. The air-conditioning system of claim 2,
wherein the relay device,
if the communication address of a transfer-destination node of the communication frame is not registered and if the relay device receives a reception acknowledgment signal from the transfer-destination node after the transfer of the communication frame, adds a communication address of the node of a transmission source and model data of the node, both of which are set in the reception acknowledgment signal, as the node information to the data table, and,
if the communication address of the transfer-destination node of the communication frame is registered and if the relay device does not receive the reception acknowledgment signal from the transfer-destination node after the transfer of the communication frame, deletes the node information corresponding to the transfer destination from the data table.

5. The air-conditioning system of claim 4,
wherein a remote controller that supplies an operation instruction to either one of the indoor unit and the outdoor unit is further set as one of the plurality of nodes, and
wherein the relay device
sets the remote controller as the model data.

6. The air-conditioning system of claim 4,
wherein a centralized management device that manages the plurality of communication networks is further set as one of the plurality of nodes, and
wherein the relay device
sets the centralized management device as the model data.

7. The air-conditioning system of claim 4,
wherein the relay device includes a plurality of the relay devices,
wherein the relay devices are connected by cascade connection through the communication networks, and
wherein the relay devices connected by the cascade connection each have
the data table to which the node information relating to a node added by the cascade connection is added.

8. The air-conditioning system of claim 1,
wherein an air-conditioning apparatus is formed of the indoor unit and the outdoor unit, the air-conditioning apparatus including
a refrigerant circuit including a compressor, a heat-source-side heat exchanger, an expansion unit, and a use-side heat exchanger, which are connected by the refrigerant pipe, the refrigerant circuit circulating a refrigerant,
an indoor fan that distributes air to the use-side heat exchanger,
an outdoor fan that distributes the air to the heat-source-side heat exchanger, and
an air-conditioning inverter device that controls rotation speeds of the compressor, the indoor fan, and the outdoor fan.

9. A relay device that transfers a communication frame, in which at least one outdoor unit and at least one indoor unit are connected by a refrigerant pipe and the communication frame is transmitted from either of the outdoor unit and the indoor unit, the relay device comprising:
a plurality of communication ports; and
a controller that transfers a communication frame, which passes through the plurality of communication ports,
wherein the communication ports have logical connection relationships with a plurality of respective communication networks,
wherein the communication networks have logical connection relationships with a plurality of respective nodes,
wherein the plurality of nodes are each associated with either of the outdoor unit and the indoor unit,
wherein among the plurality of nodes,
a certain node is set as a first node, and
another certain node different from the first node is set as a second node,
wherein the controller
executes transfer processing of transferring a communication frame from the first node to the second node, and then,
if the controller does not receive a reception acknowledgment signal from the second node, limits a number of re-transmission times when the controller re-transfers the communication frame to the second node, and
wherein the controller
sets the number of re-transmission times at zero if a transfer destination of the communication frame is not registered,
sets the number of re-transmission times at a different value in association with a preset number of normal re-transmission times, depending on a crowded degree of communication traffic, if the transfer destination of the communication frame is registered, and
outputs the communication frame from the communication ports to the plurality of nodes of the communication networks having the logical connection relationships with the communication ports.

10. The relay device of claim 9,
wherein the controller
sets node information for each of the plurality of nodes having the connection relationships with the communication networks,
sets a communication address for the node in the node information,
sets a data table, in which a plurality of pieces of the node information are formed on a communication port basis, and
transfers the communication frame based on the data table.

11. The relay device of claim 9,
wherein the controller
sets node information for each of the plurality of nodes having the connection relationships with the communication networks,
sets at least a pair, the pair comprising a communication address for the node and model data of either of the outdoor unit and the indoor unit corresponding to the node in the node information,
sets a data table, in which a plurality of pieces of the node information are formed on a communication port basis, and
transfers the communication frame based on the data table.

12. The relay device of claim 10,
wherein the controller,
if the communication address of a transfer-destination node of the communication frame is not registered and if the controller receives a reception acknowledgment signal from the transfer-destination node after the transfer of the communication frame, adds a communication address of the node of a transmission source and model data of the node, both of which are set in the reception acknowledgment signal, as the node information to the data table, and
if the communication address of the transfer-destination node of the communication frame is registered and if the controller does not receive the reception acknowledgment signal from the transfer-destination node after the transfer of the communication frame, deletes the node information corresponding to the transfer destination from the data table.

13. The relay device of claim 12,
wherein a remote controller that supplies an operation instruction to either one of the indoor unit and the outdoor unit is further set as one of the plurality of nodes, and
wherein the controller
sets the remote controller as the model data.

14. The relay device of claim 12,
wherein a centralized management device that manages the plurality of communication networks is further set as one of the plurality of nodes, and
wherein the controller
sets the centralized management device as the model data.

15. The relay device of claim 13,
wherein the plurality of communication ports and the controller are installed in any of the indoor unit, the outdoor unit, and the remote controller.

16. The relay device of claim 14,
wherein the plurality of communication ports and the controller are installed in the centralized management device.

17. The relay device of claim 15,
wherein the relay device is connected by cascade connection through corresponding one of the communication networks, and
wherein the relay device has the data table to which the node information relating to a node added by the cascade connection is added.

* * * * *